United States Patent
Ogawa

(10) Patent No.: US 6,313,958 B1
(45) Date of Patent: *Nov. 6, 2001

(54) DIFFRACTIVE-REFRACTIVE PHOTOGRAPHIC OPTICAL SYSTEM

(75) Inventor: Hideki Ogawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,750

(22) Filed: Sep. 29, 1998

(30) Foreign Application Priority Data

Oct. 3, 1997 (JP) .................................................. 9-287910

(51) Int. Cl.⁷ ............................ G02B 13/02; G02B 27/44
(52) U.S. Cl. ............................ 359/745; 359/746; 359/558
(58) Field of Search ..................................... 359/565, 566, 359/677, 745–748, 558

(56) References Cited

U.S. PATENT DOCUMENTS

| | | | |
|---|---|---|---|
| 5,446,588 | * | 8/1995 | Missig et al. ........................ 359/565 |
| 5,715,090 | * | 2/1998 | Meyers ................................. 359/565 |
| 5,717,525 | * | 2/1998 | Estelle et al. ........................ 359/677 |
| 5,748,372 | * | 5/1998 | Kitagawa ............................. 359/565 |
| 5,754,340 | * | 5/1998 | Ushida et al. ....................... 359/566 |
| 5,872,658 | * | 2/1999 | Ori ...................................... 359/677 |
| 6,002,519 | * | 12/1999 | Hayashi et al. ..................... 359/557 |

FOREIGN PATENT DOCUMENTS 6-324262    11/1994    (JP) .

* cited by examiner

*Primary Examiner*—Scott J. Sugarman
(74) *Attorney, Agent, or Firm*—Fitzpatrick, Cella, Harper & Scinto

(57) ABSTRACT

An optical system includes positive and negative refractive optical elements and positive and negative diffractive optical elements for diffracting light from the positive and negative optical elements.

26 Claims, 20 Drawing Sheets

PARAXIAL ON-AXIAL RAY
PUPIL PARAXIAL RAY

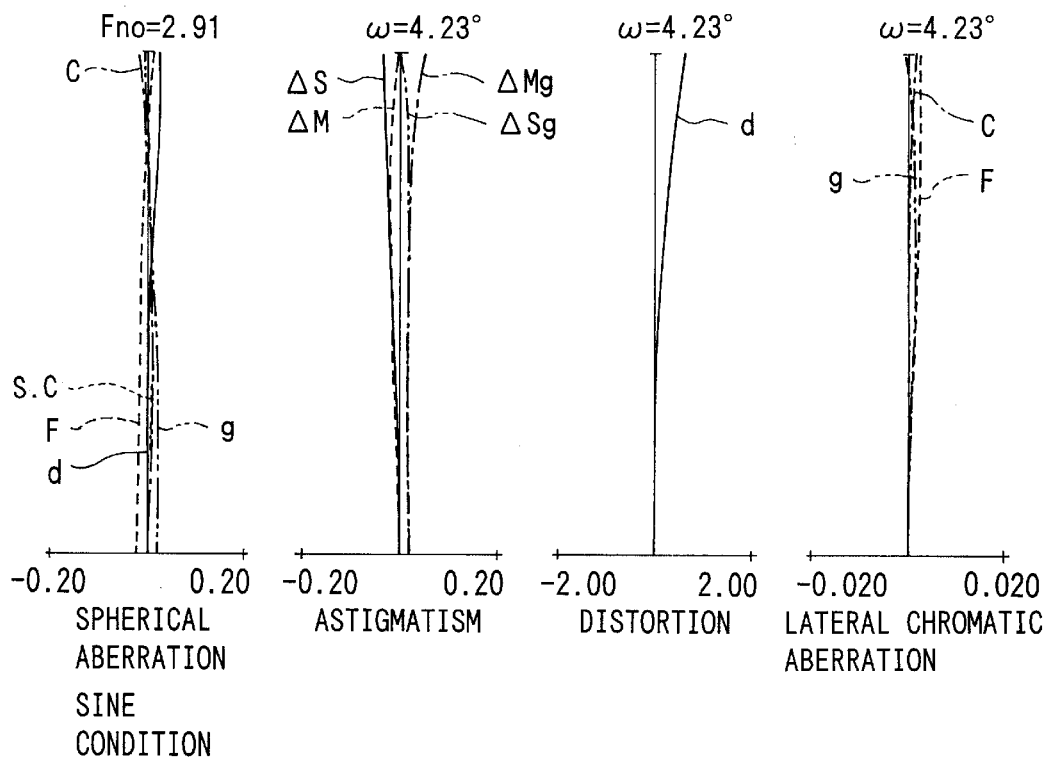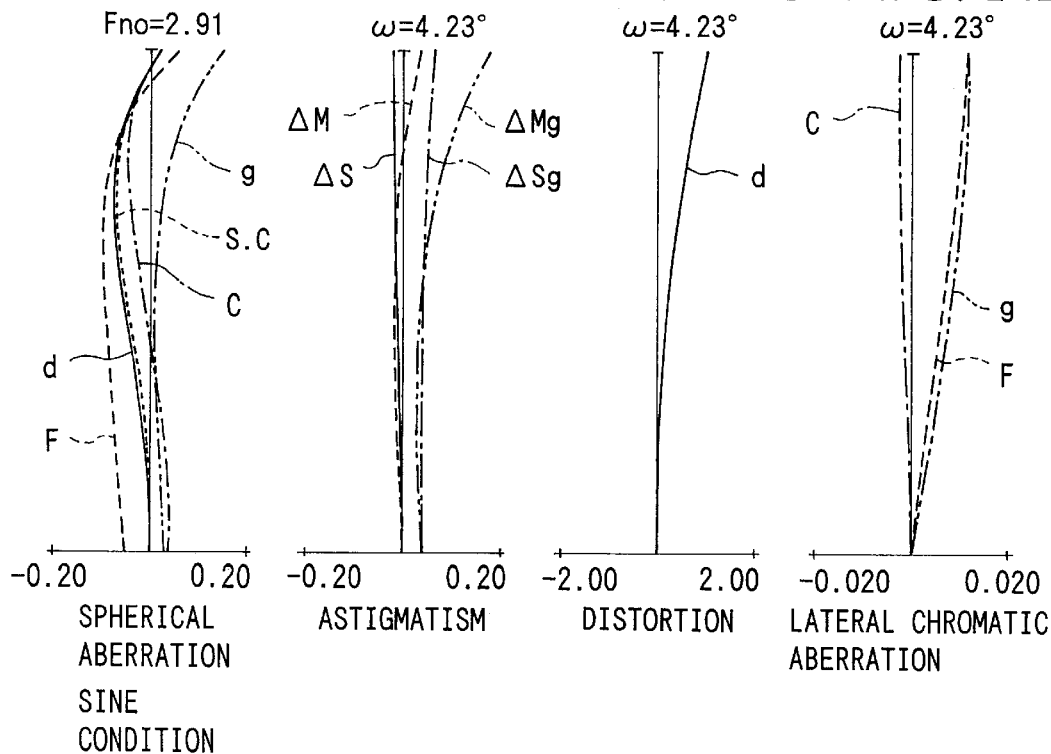

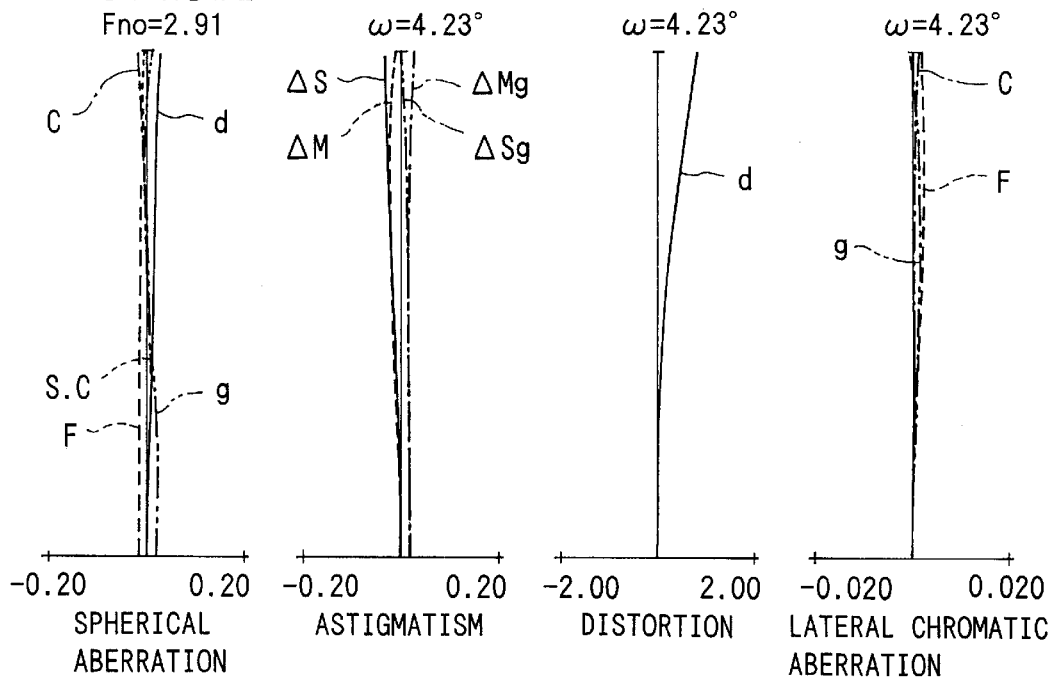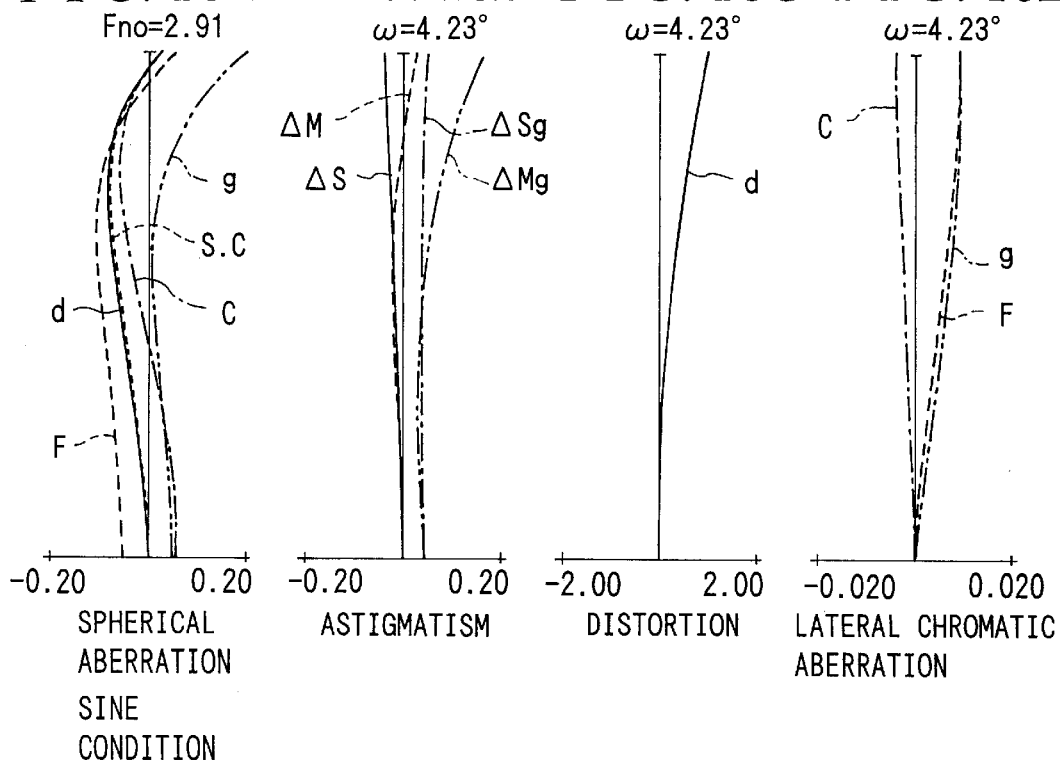

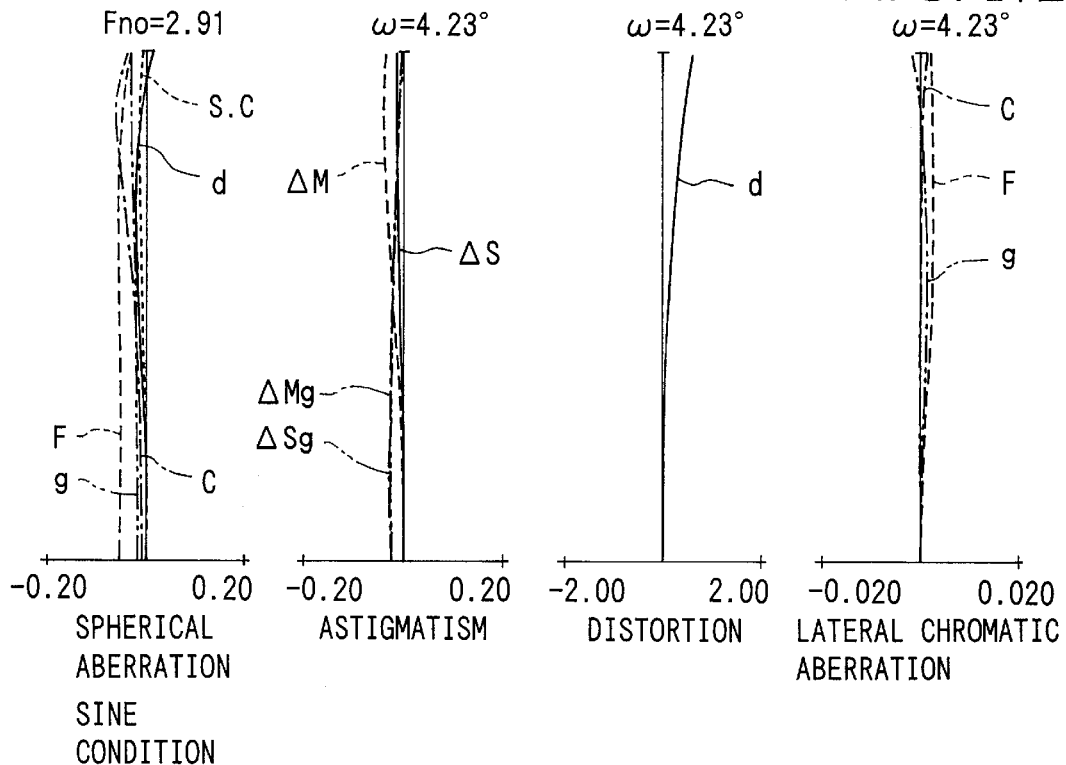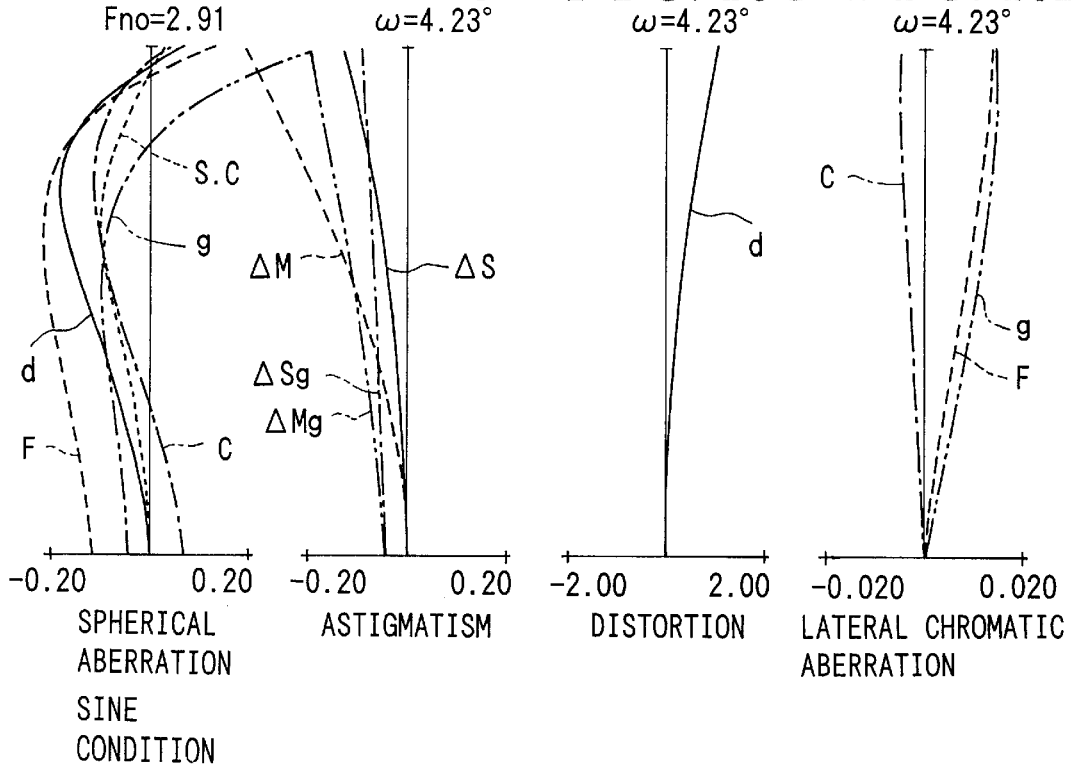

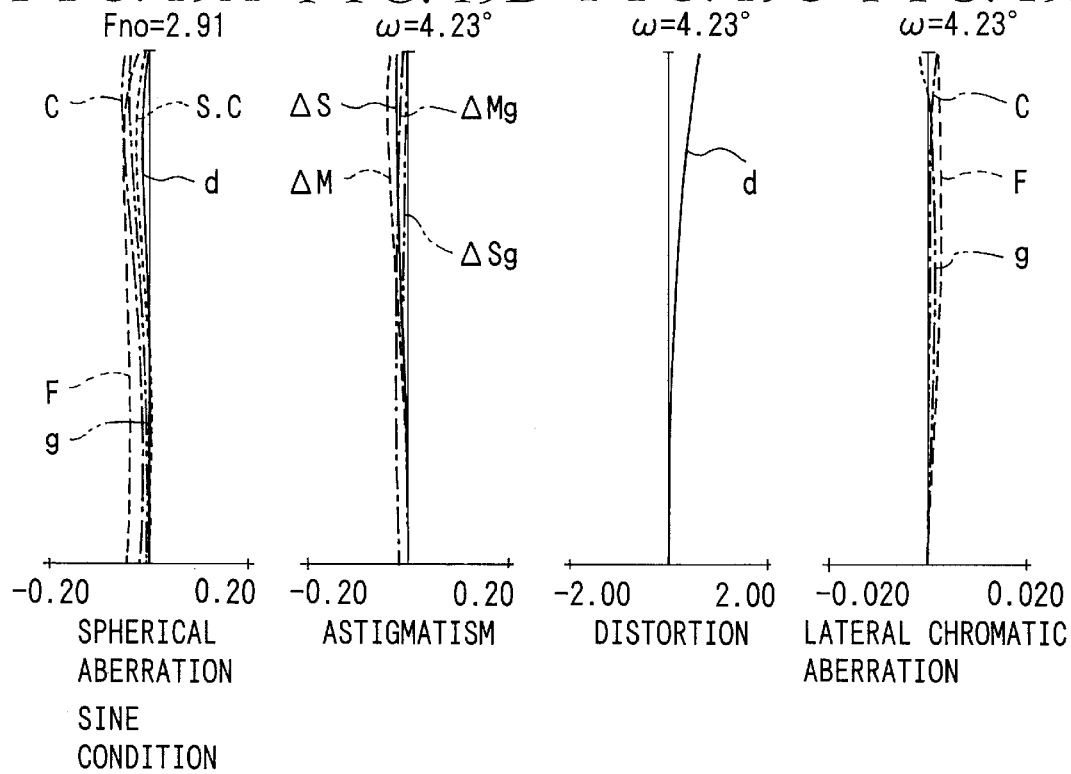
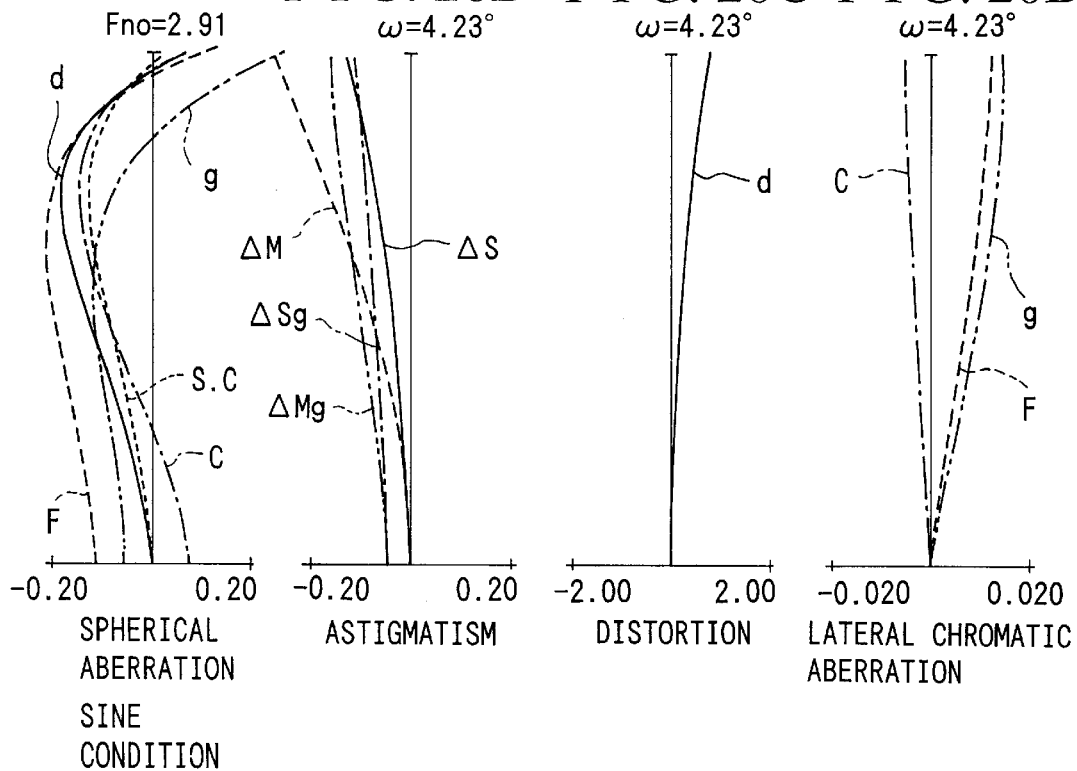

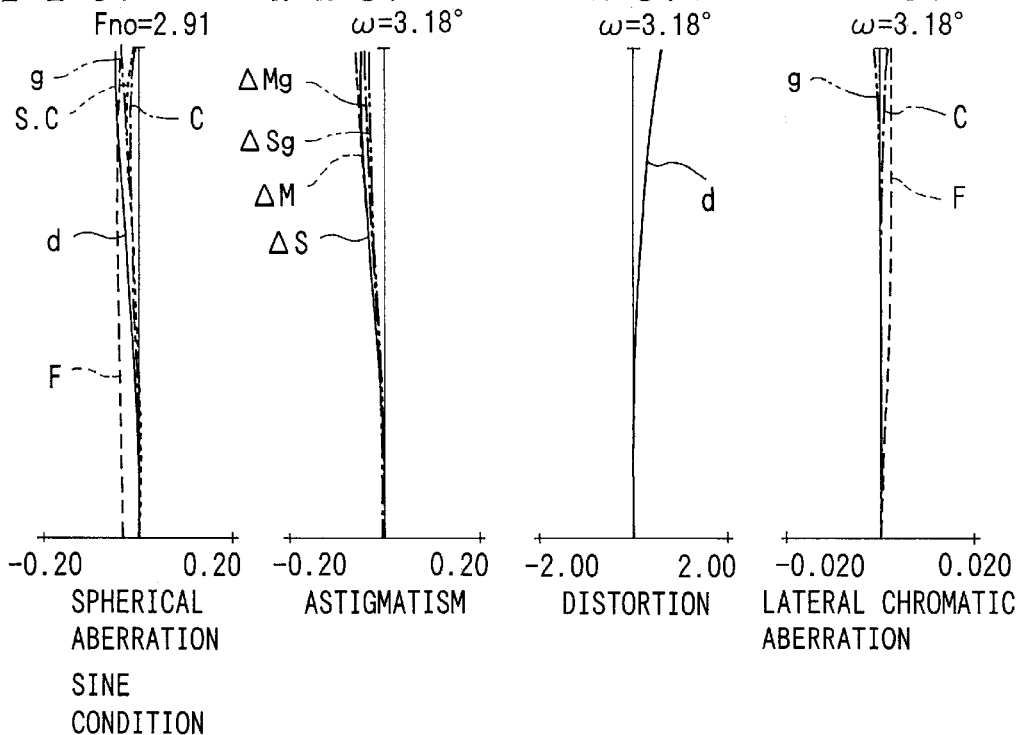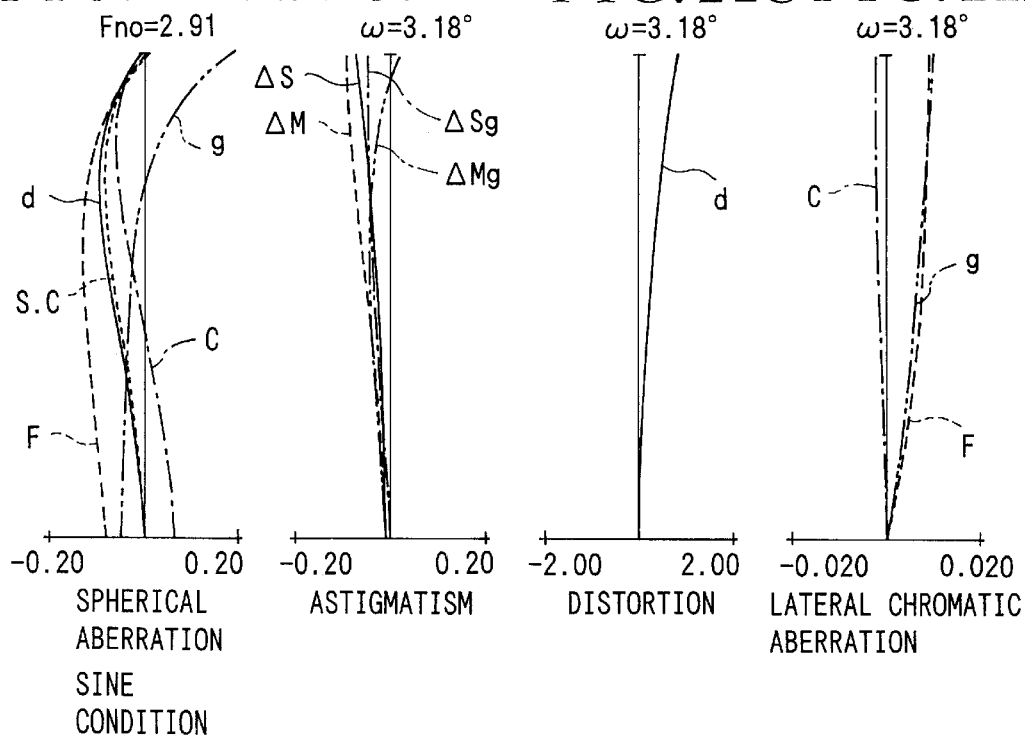

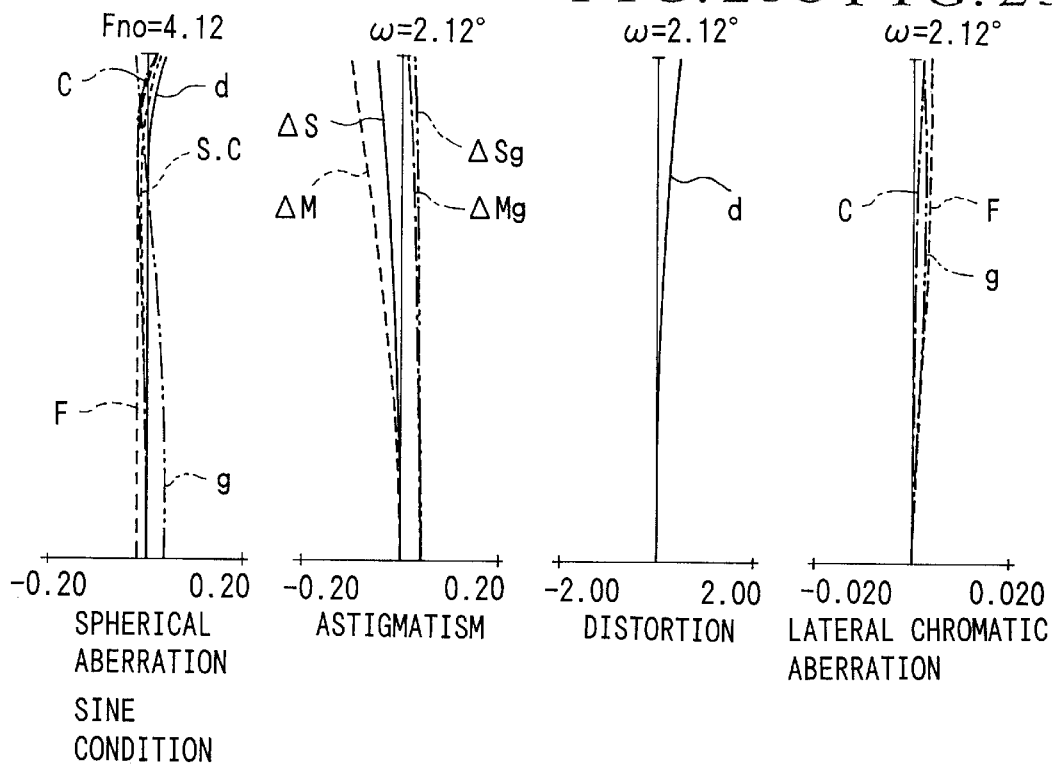
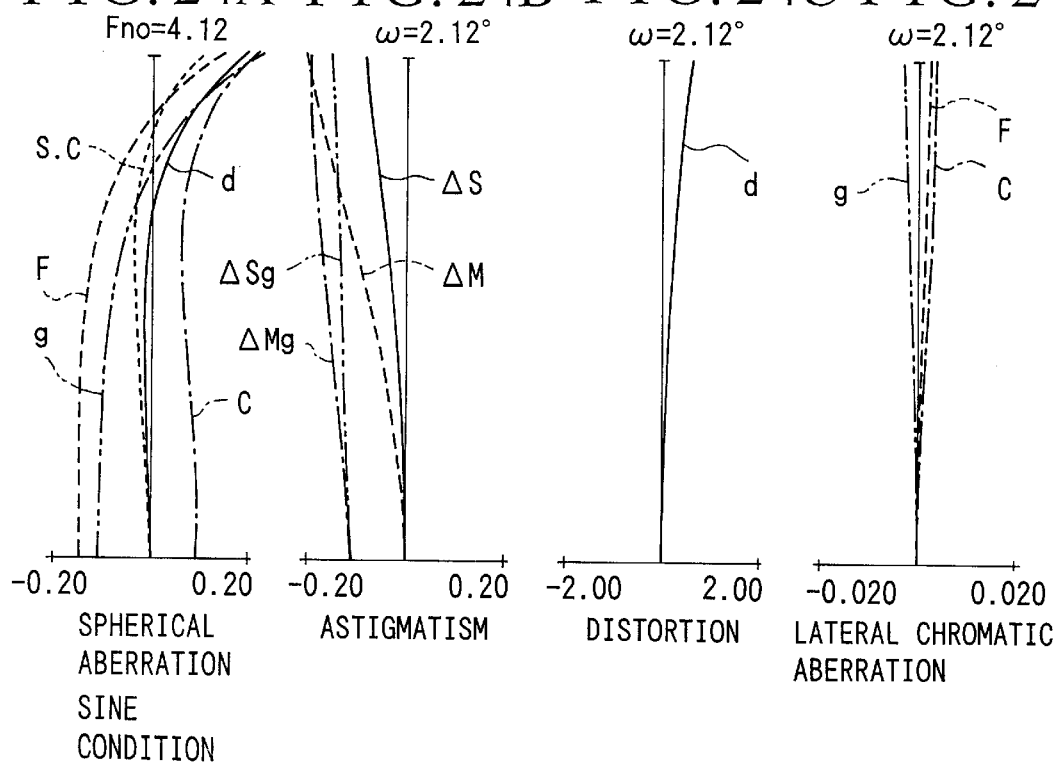

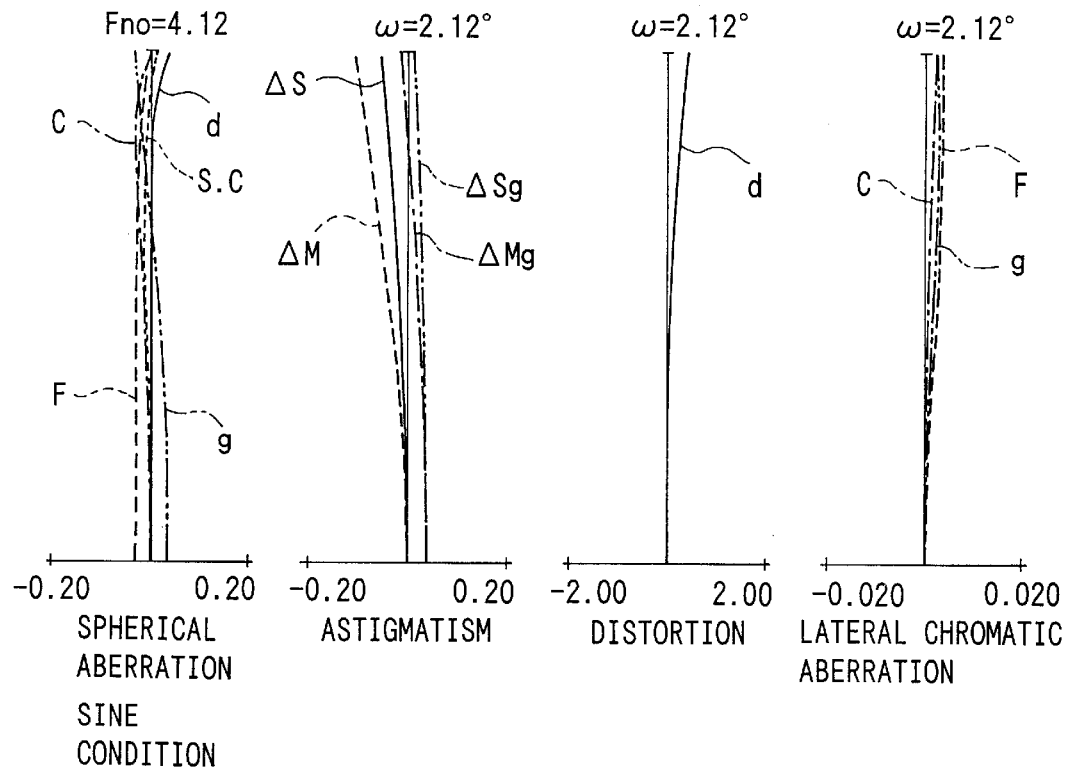
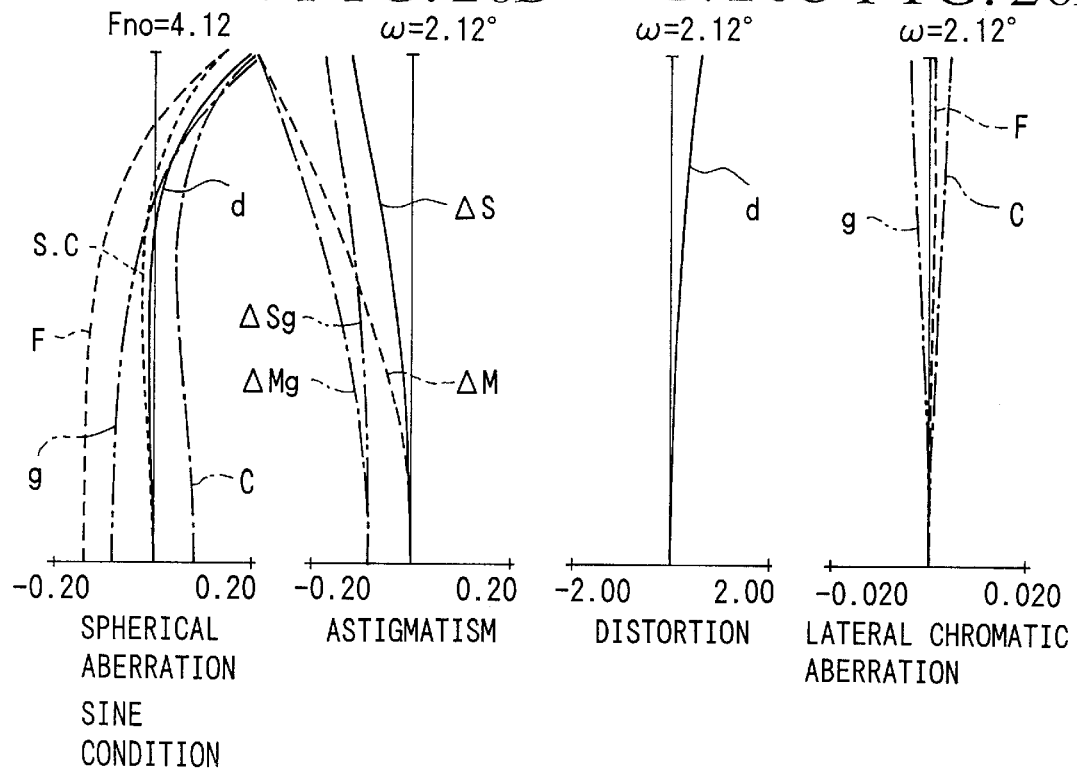

DIFFRACTIVE-REFRACTIVE PHOTOGRAPHIC OPTICAL SYSTEM

BACKGROUND OF THE INVENTION

1. Field of the Invention

The present invention relates to photographic optical systems suited to silver-halide photographic cameras, video cameras, electronic still cameras or the like and, more particularly, to a diffractive-refractive photographic optical system of large relative aperture having a combination of a refractive optical system and a diffractive optical system and corrected well for the imaging performance of the entire optical system.

2. Description of Related Art

Telephoto lenses have generally a tendency to increase their longitudinal and lateral chromatic aberration as the focal length increases. To correct these chromatic aberrations, it has been the common practice to use a low-dispersion positive lens of fluorite or like material having an extraordinary partial dispersion in combination with a high-dispersion negative lens of another glass material, thereby obtaining achromatism.

However, the extraordinary partial-dispersion glass such as fluorite, though being advantageous for correcting chromatic aberrations, has a drawback that it is very expensive. The specific gravity of the extraordinary partial-dispersion glass is greater than that of the other low-dispersion glasses having no extraordinary partial dispersion. Therefore, the extraordinary partial dispersion glass has another drawback that the whole lens system becomes heavier. For example, fluorite has a specific gravity of 3.18, and FKO1 has a specific gravity of 3.63. On the other hand, FK5, which has small extraordinary partial dispersion, has a specific gravity of 2.46, and BK7, which also has small extraordinary partial dispersion, has a specific gravity of 2.52.

Furthermore, the surface of the extraordinary partial-dispersion glass is relatively susceptible to scratches. Some large-relative-aperture lenses to which the extraordinary partial-dispersion glass is applied are liable to crack when the temperature changes rapidly. Also, in a case where the extraordinary partial-dispersion glass is used in a lens (positive lens) disposed closest to the object side, in order to prevent this lens from being damaged by scratches or cracks, there is a need usually to use a protection glass in the form of a parallel flat plate. So, yet another drawback is produced that the entirety of the lens system increases in weight and cost as much as this protection glass.

With the glasses having no extraordinary partial dispersion left in use, the telephoto lens is corrected for chromatic aberrations by making some other provisions, as in Japanese Laid-Open Patent Application No. Hei 6-324262. In this document, there is disclosed a telephoto lens that includes at least one diffractive optical element having a positive refractive power, at least one refractive optical element having a positive refractive power and at least one refractive optical element having a negative refractive power. That telephoto lens has an F-number of about 2.8 and is relatively corrected well for chromatic aberrations.

However, in that telephoto lens, the diffractive optical element is positioned in a front section of the optical system where both the paraxial on-axial ray and the pupil paraxial ray enter at respective heights (from the optical axis) both of which are relatively large. So, the diffractive optical element gets a large diameter and the production cost thereof becomes high.

For example, to manufacture diffraction gratings at a relatively excellent mass productivity, there is a method of stamping glass by a metallic mold or like means, while melting at a high temperature. Another method is to apply a layer of ultraviolet-ray setting resin to the surface of a glass substrate. A pattern is then formed by a stamping press and then the layer is exposed to ultraviolet rays to harden. Another method is to mold plastic resin itself by a die. In any case, as the diameter of the diffractive optical element increases, the pattern transferability and the die releaseability deteriorate, so that the desired performance or sufficient diffraction efficiency cannot be obtained.

Also, the method of directly cutting glass to form the diffraction grating and the method of wet or dry etching a flat substrate of $SiO_2$ or others to form the grating grooves in stepwise patterns are usable. However, as the diameter of the diffractive optical element increases, the mass productivity becomes poor and the production cost increases.

BRIEF SUMMARY OF THE INVENTION

It is an object of the invention to provide an optical system which can make the diffractive optical element smaller in size than heretofore possible.

In accordance with a first aspect of the invention, there is provided an optical system, which comprises positive and negative refractive optical elements, and positive and negative diffractive optical elements for diffracting light from the positive and negative refractive optical elements.

In accordance with a second aspect of the invention, there is provided an optical system, which comprises, positive and negative refractive optical elements, and positive and negative diffractive optical elements for diffracting light from the positive and negative refractive optical elements, wherein the positive diffractive optical element is located between the positive and negative refractive optical elements and the negative diffractive optical element.

In accordance with a third aspect of the invention, there is provided an image forming optical system including a plurality of optical units, which comprises a positive optical unit disposed closest to an object side, the positive optical unit having at least one positive refractive optical element and at least one negative refractive optical element, a positive diffractive optical element disposed closer to an image side than the positive optical unit, and a negative diffractive optical element disposed closer to the image side than the positive diffractive optical element. In the image forming optical system, a diffraction grating of each of the positive and negative diffractive optical elements has a form of revolution symmetry with respect to an optical axis. Further, the image forming optical system comprises a negative optical unit having a negative refractive optical element and disposed between the positive optical unit and the positive diffractive optical element. Then, the negative refractive optical element in the negative optical unit is one or plural in number, and focusing is effected by moving the negative optical unit along the optical axis. Further, the image forming optical system satisfies the following conditions:

$|h_B/h_A| < 1$ $|H_A/H_B| < 0$ $-1 < H_B/H_1 < 0$ where $h_A$ is a height of a paraxial on-axial ray incident on the positive diffractive optical element, $h_B$ is a height of a paraxial on-axial ray incident on the negative diffractive optical element, $H_A$ is a height of a pupil paraxial ray incident on the positive diffractive optical element, $H_B$ is a height of a pupil paraxial ray incident on the negative diffractive optical element, and $H_1$ is a height from the optical axis of a pupil paraxial ray incident on a surface on the object side of a lens disposed closest to the object side included in the positive optical unit.

More preferably, the image forming optical system satisfies the following conditions:

$$|h_B/h_A|<0.95$$

$$|H_A/H_B|<0.95$$

$$-0.95<H_B/H_1<-0.01.$$

In the optical system according to each of the first to third aspects, there is an aspect in which the positive and negative diffractive optical elements are formed respectively on a surface on the object side and a surface on the image side of a single element.

Further, in the optical system according to each of the first to third aspects, it is preferred to satisfy the following conditions:

$$0.05<\phi_A/\phi<2$$

$$-2<\phi_B/\phi<0.05$$

where $\phi$ is a refractive power of the entire optical system, $\phi_A$ is a refractive power for a first-order diffracted ray of the positive diffractive optical element, and $\phi_B$ is a refractive power for a first-order diffracted ray of the negative diffractive optical element.

Further, in the optical system according to each of the first to third aspects, it is preferred to satisfy the following condition:

$$5<\nu_P-\nu_N<75$$

where, as the positive refractive optical element is one or plural in number, and the negative refractive optical element is one or plural in number, $\nu_P$ is a value of an Abbe number of the one positive refractive optical element or a mean value of Abbe numbers of the plural positive refractive optical elements, and $\nu_N$ is a value of an Abbe number of the one negative refractive optical element or a mean value of Abbe numbers of the plural negative refractive optical elements.

More preferably, the optical system satisfies the following condition:

$$15<\nu_P-\nu_N<45.$$

Incidentally, in the present specification, the term "positive" refers to an element having a positive refractive power (i.e., 1/(focal length)>0), and the term "negative" refers to an element having a negative refractive power (i.e., 1/(focal length)<0). Further, a typical one of "refractive optical elements" is an ordinary lens having a curved refractive surface.

The above and further objects and aspects of the invention will become apparent from the following detailed description of preferred embodiments thereof taken in conjunction with the accompanying drawings.

BRIEF DESCRIPTION OF THE SEVERAL VIEWS OF THE DRAWING

FIGS. 13A to 13D are graphic representations of the aberrations of the numerical example 1 with focusing on an object at infinity.

FIGS. 14A to 14D are graphic representations of the aberrations of the numerical example 1 with focusing on an object at a short distance.

FIGS. 15A to 15D are graphic representations of the aberrations of the numerical example 2 with focusing on an object at infinity.

FIGS. 16A to 16D are graphic representations of the aberrations of the numerical example 2 with focusing on an object at a short distance.

FIGS. 17A to 17D are graphic representations of the aberrations of the numerical example 3 with focusing on an object at infinity.

FIGS. 18A to 18D are graphic representations of the aberrations of the numerical example 3 with focusing on an object at a short distance.

FIGS. 19A to 19D are graphic representations of the aberrations of the numerical example 4 with focusing on an object at infinity.

FIGS. 20A to 20D are graphic representations of the aberrations of the numerical example 4 with focusing on an object at a short distance.

FIGS. 21A to 21D are graphic representations of the aberrations of the numerical example 5 with focusing on an object at infinity.

FIGS. 22A to 22D are graphic representations of the aberrations of the numerical example 5 with focusing on an object at a short distance.

FIGS. 23A to 23D are graphic representations of the aberrations of the numerical example 6 with focusing on an object at infinity.

FIGS. 24A to 24D are graphic representations of the aberrations of the numerical example 6 with focusing on an object at a short distance.

FIGS. 25A to 25D are graphic representations of the aberrations of the numerical example 7 with focusing on an object at infinity.

FIGS. 26A to 26D are graphic representations of the aberrations of the numerical example 7 with focusing on an object at a short distance.

DETAILED DESCRIPTION OF THE INVENTION

Hereinafter, preferred embodiments of the invention will be described in detail with reference to the drawings.

FIGS. 1 to 7 in block diagrams show numerical examples 1 to 7 of the optical system. The optical system comprises, in order from the object side, a first lens unit L1 of positive refractive power including at least one positive lens and at least one negative lens and disposed closest to the object side, a second lens unit L2 of negative refractive power including at least one positive lens and at least one negative lens, one or plural flat-plate-shaped optical members L3 (shown by one) disposed closer to the image side than the second lens unit L2 and having a first diffractive surface A of positive refractive power, one or plural flat-plate-shaped optical members L4 (shown by one) disposed closer to the image side than the first diffractive surface A and having a second diffractive surface B of negative refractive power, and an optical member L5, excluding lenses, such as filter. Each of the first and second diffractive surfaces A and B is formed to a diffraction grating of revolution symmetry with respect to an optical axis, as will be described more fully later.

Figure 1:
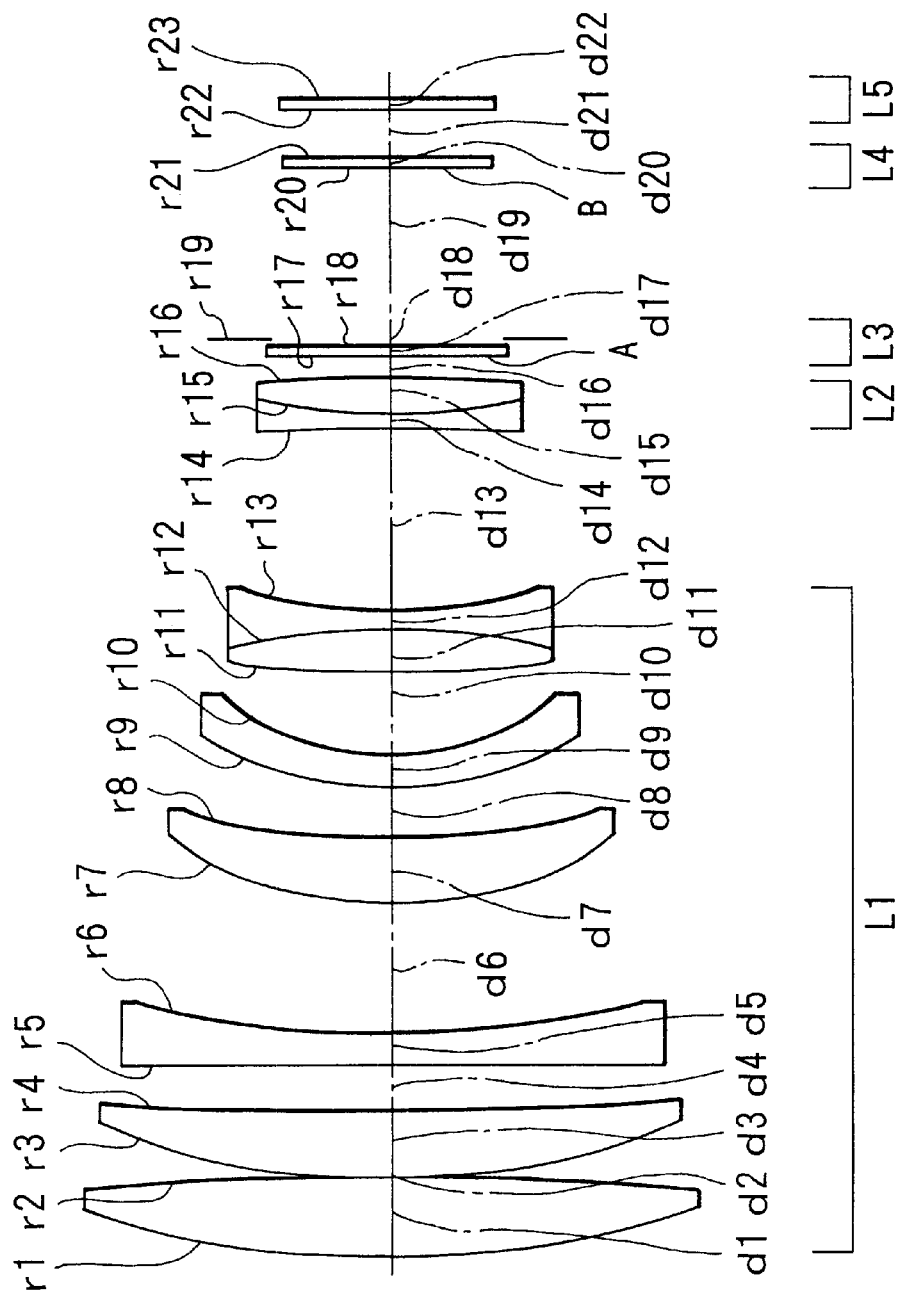
FIG. 1 is a longitudinal section view of a numerical example 1 of the optical system.
Figure 2:
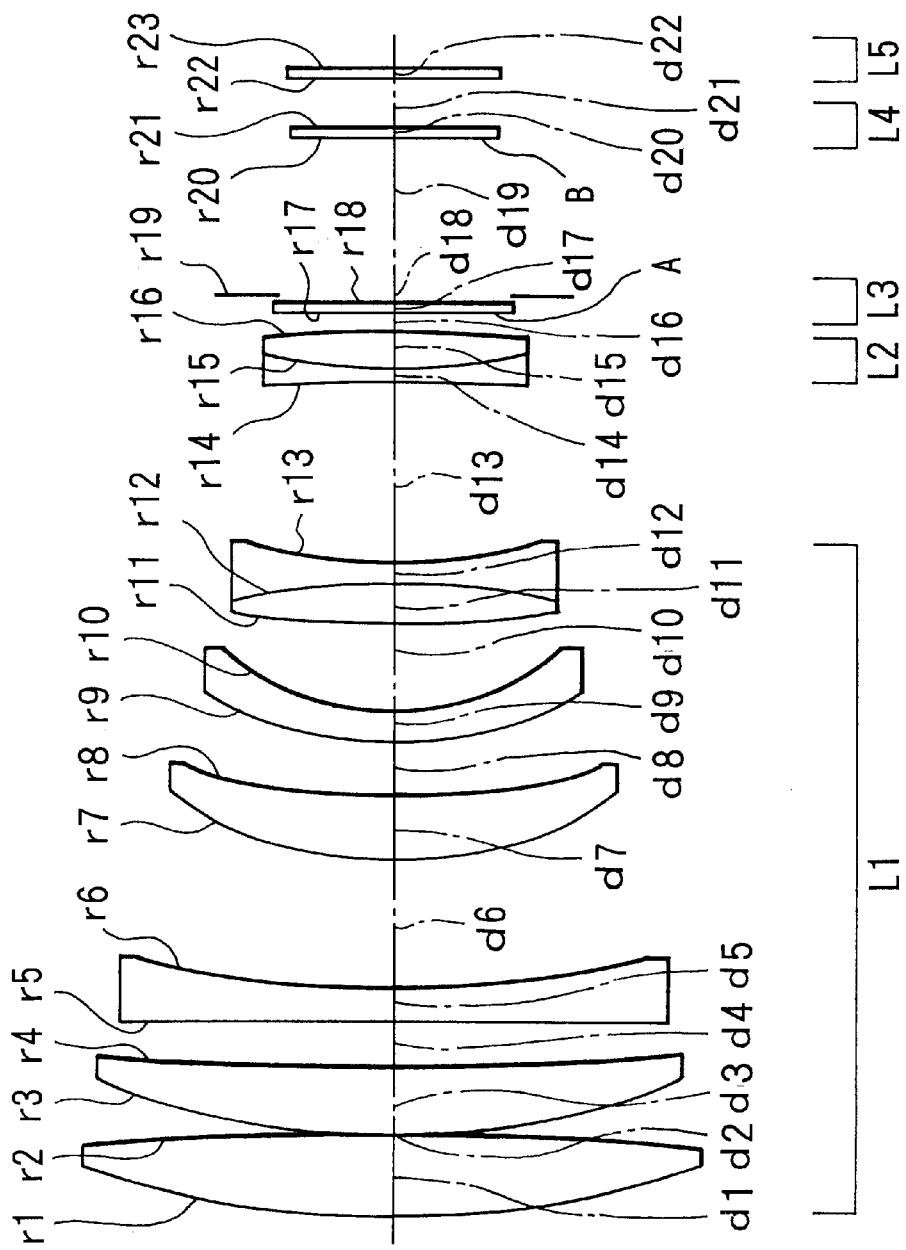
FIG. 2 is a longitudinal section view of a numerical example 2 of the optical system.
Figure 3:
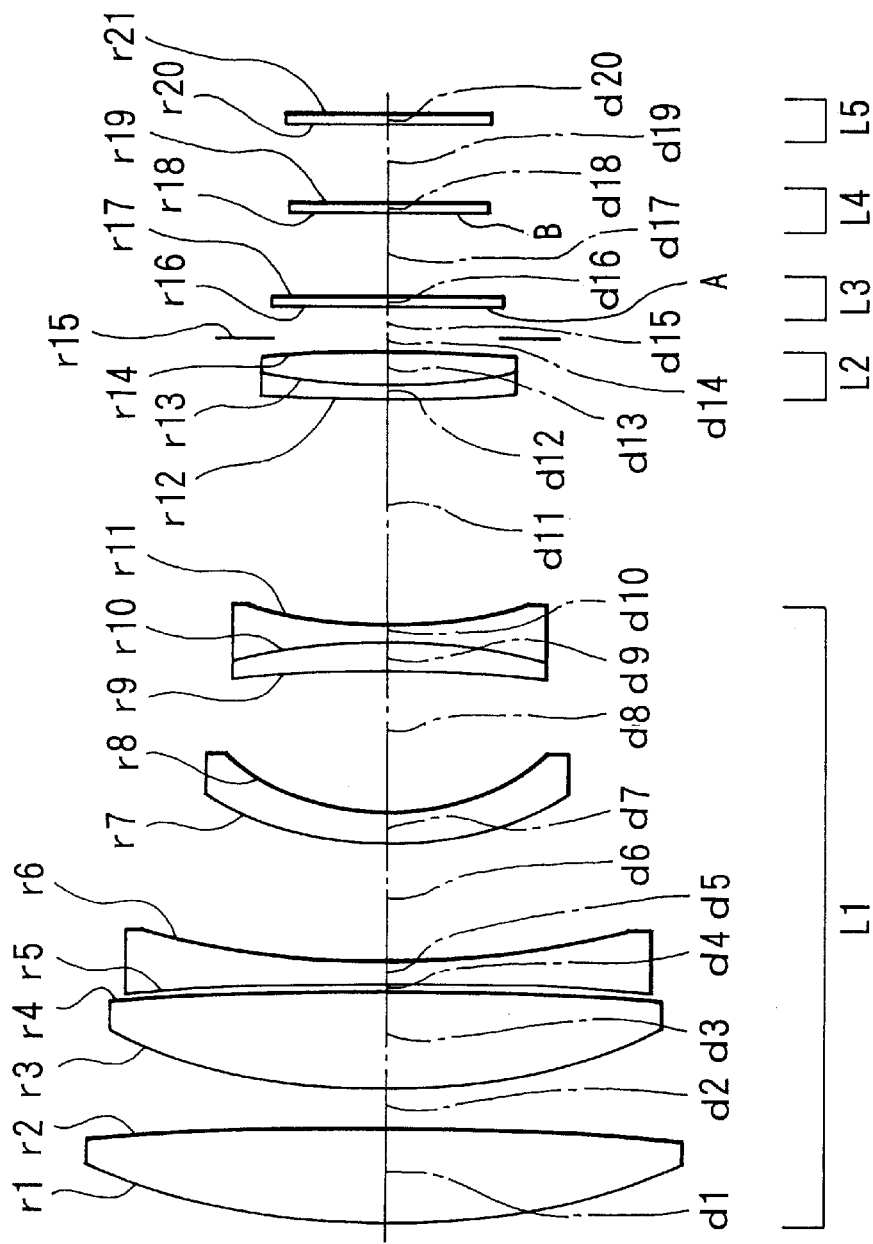
FIG. 3 is a longitudinal section view of a numerical example 3 of the optical system.
Figure 4:
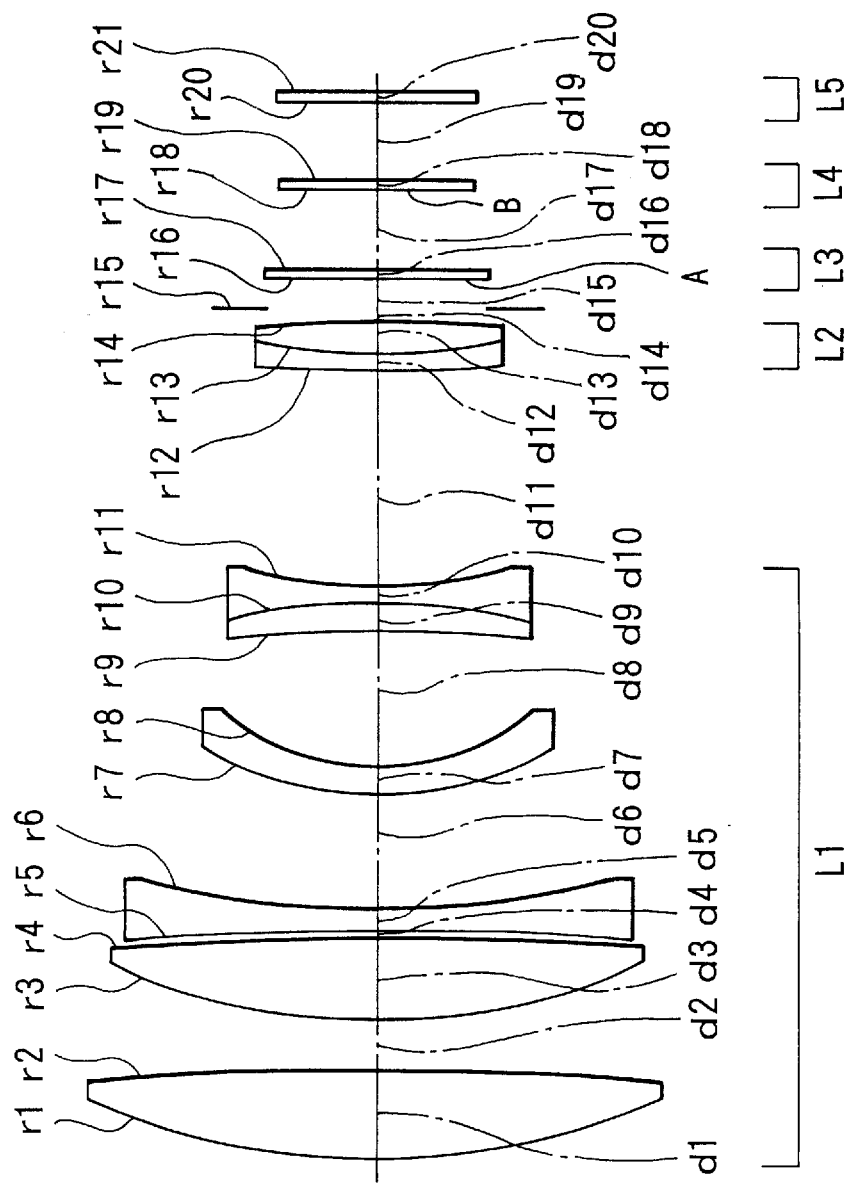
FIG. 4 is a longitudinal section view of a numerical example 4 of the optical system.
Figure 5:
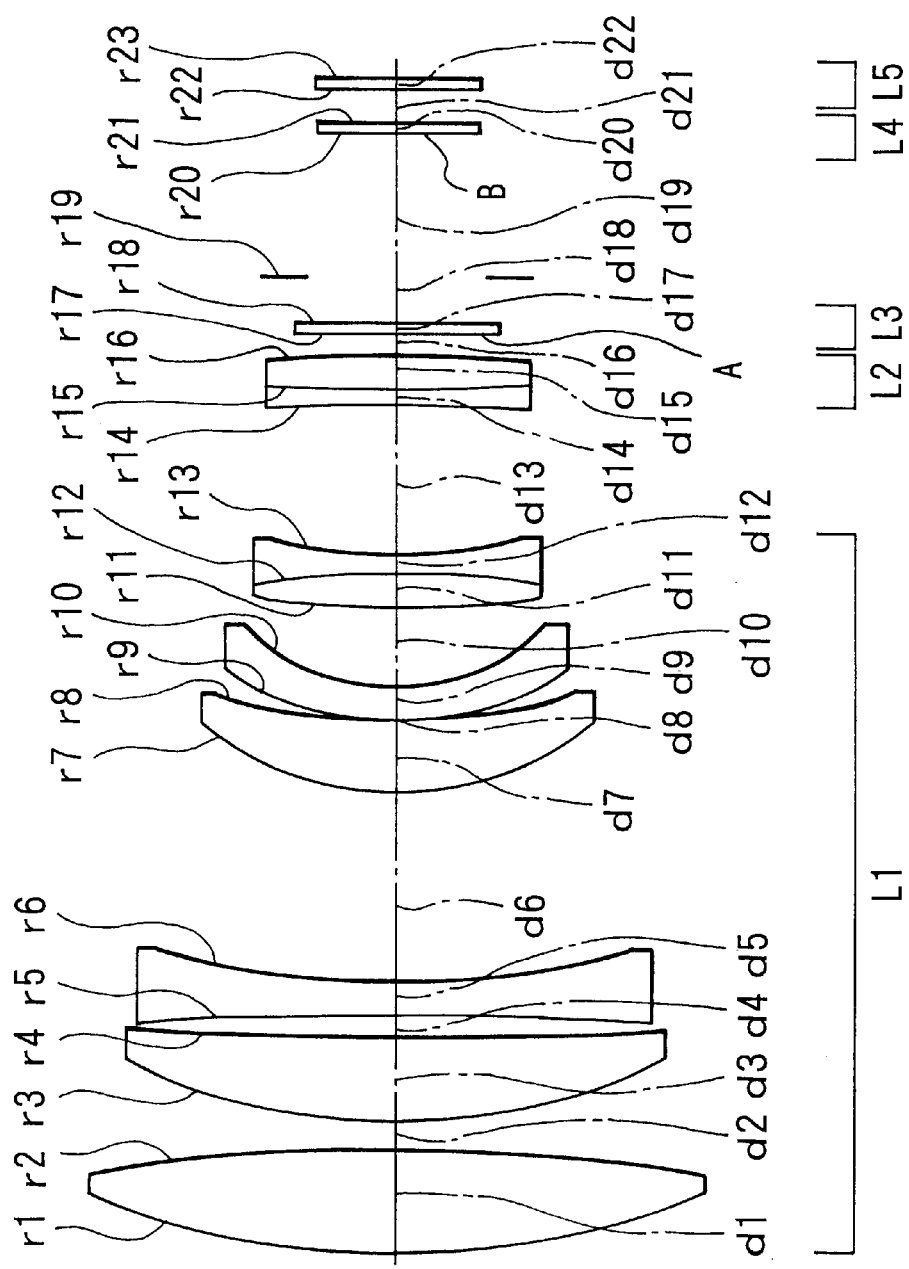
FIG. 5 is a longitudinal section view of a numerical example 5 of the optical system.
Figure 6:
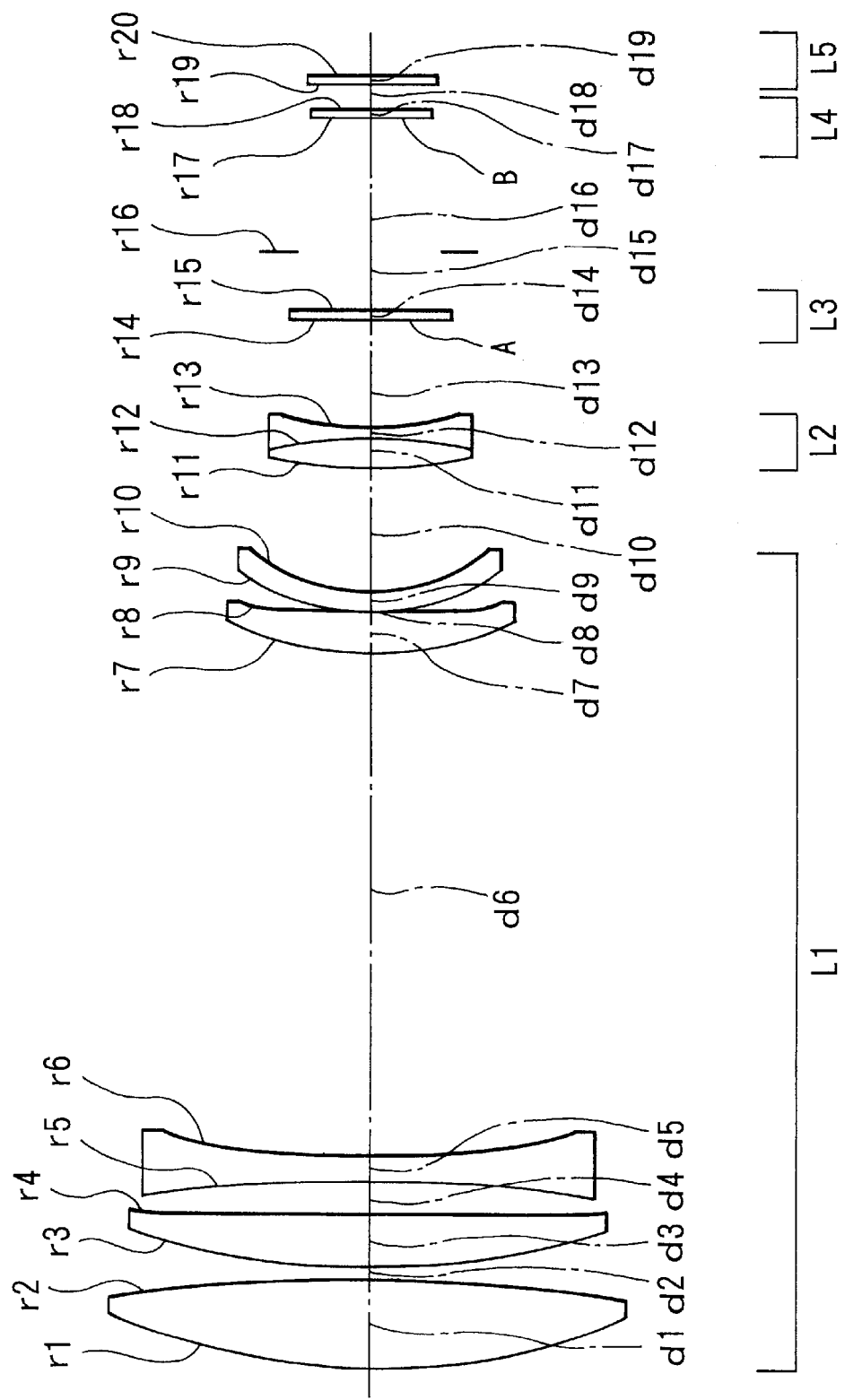
FIG. 6 is a longitudinal section view of a numerical example 6 of the optical system.
Figure 7:
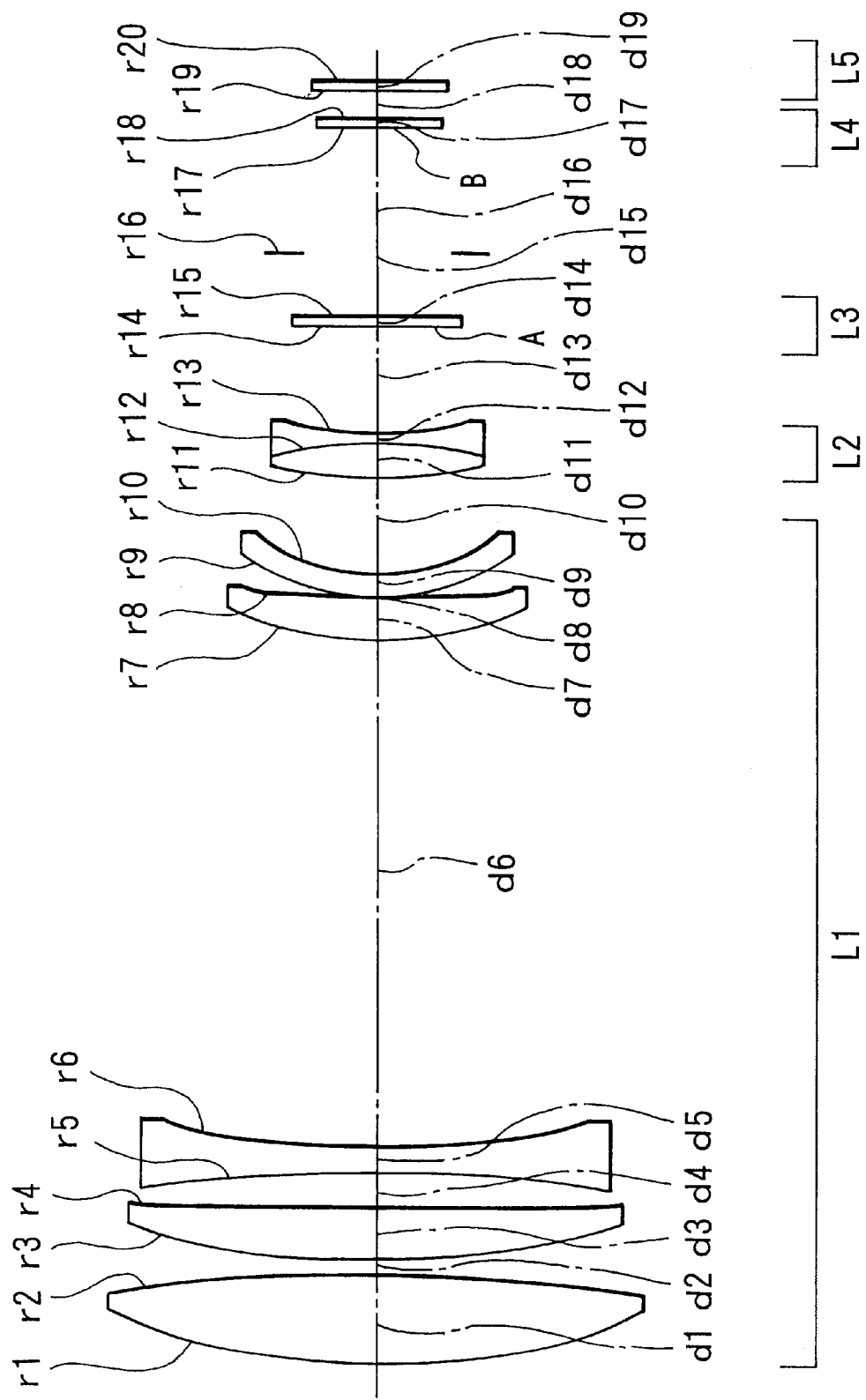
FIG. 7 is a longitudinal section view of a numerical example 7 of the optical system.
Figure 8:
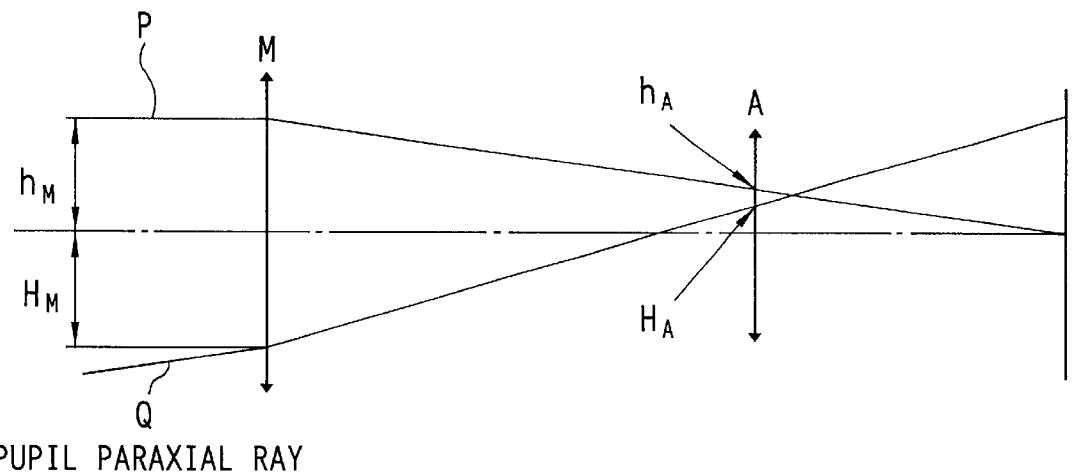
FIG. 8 is a diagram of the geometry in the paraxial zone of the optical system having one diffractive surface.
Figure 9:
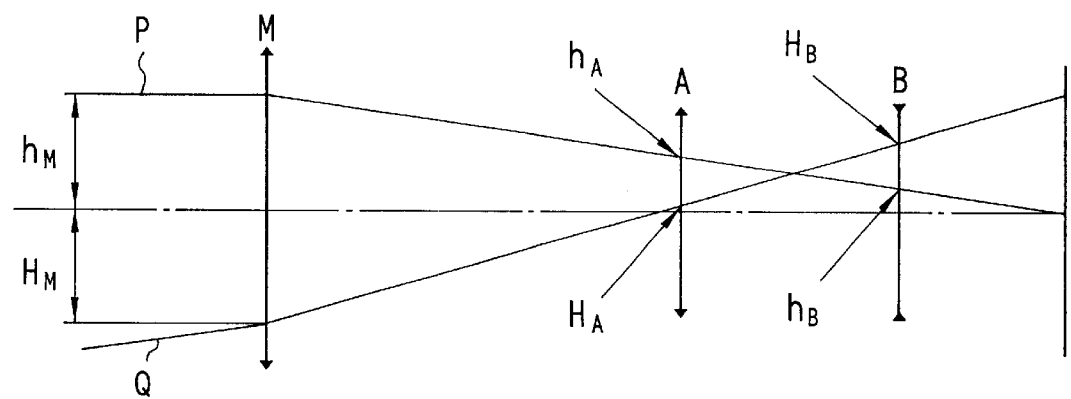
FIG. 9 is a diagram of the geometry in the paraxial zone of the optical system having two diffractive surfaces.

FIGS. 8 and 9 are schematic diagrams of the paraxial arrangement for explaining the functions that premise the invention. FIG. 8 shows the case of the optical system having only one diffractive surface, and FIG. 9 shows the case of the optical system having two diffractive surfaces. Reference symbol M denotes a refractive optical system section constituting a telephoto lens. Here, for the purpose of simply dealing with the matter, the refractive optical system section M is considered as a thin single lens. Also, reference symbol A denotes a first diffractive surface, and reference symbol B denotes a second diffractive surface. Reference symbol P denotes a paraxial on-axial ray of light, and reference symbol Q denotes a pupil paraxial ray of light.

At first, in consideration of the case where the diffractive surface is only one in number, for the refractive optical system section M and the first diffractive surface A, the longitudinal chromatic aberration coefficient L and the lateral chromatic aberration coefficient T are expressed by the following equations:

$$L = h_M^2 \phi_M / \nu_M + h_A^2 \phi_A / \nu_A \tag{1}$$

$$T = h_M H_M \phi_M / \nu_M + h_A H_A \phi_A / \nu_A \tag{2}$$

where $\phi_M$: the refractive power of the refractive optical system section constituting the telephoto lens, $\phi_A$: the refractive power for the design-order diffracted ray of the first diffractive surface A, $\nu_M$: the Abbe number of the refractive optical system section (of the thin single lens) constituting the telephoto lens, $\nu_A$: the reduced Abbe number (equivalent to −3.45) of the first diffractive surface A, $h_M$: the height of the paraxial on-axial ray incident on the refractive optical system section constituting the telephoto lens, $h_A$: the height of the paraxial on-axial ray incident on the first diffractive surface A, $H_M$: the height of the pupil paraxial ray incident on the refractive optical system section constituting the telephoto lens, and $H_A$: the height of the pupil paraxial ray incident on the first diffractive surface A.

In the equation (1), the first term expresses the longitudinal chromatic aberration coefficient of the refractive optical system section. From "$\phi_M > 0$" and "$\nu_M > 0$", there is obtained "$h_M^2 \phi_M / \nu_M > 0$".

To reduce the longitudinal chromatic aberration coefficient of the entire system, therefore, the second term of the equation (1) which expresses the longitudinal chromatic aberration coefficient of the first diffractive surface A must take a negative value. That is, "$h_A^2 \phi_A / \nu_A < 0$" is required. Incidentally, since "$\nu_A < 0$", the refractive power of the first diffractive surface A is found to be "$\phi_A > 0$".

For the same optical system, in the second equation (2), the second term expresses the lateral chromatic aberration coefficient of the first diffractive surface A. From "$h_A > 0$", "$H_A > 0$" and "$\nu_A < 0$", there is obtained "$h_A H_A \phi_A / \nu_A < 0$".

The first term in the second equation (2) expresses the lateral chromatic aberration of the refractive optical system section. From "$h_M > 0$, "$H_M < 0$", $\phi_M > 0$" and "$\nu_M > 0$", there is also obtained "$h_M H_M \phi_M / \nu_M < 0$". Accordingly, it is impossible to reduce the lateral chromatic aberration coefficient of the entire system in such a manner that the lateral chromatic aberration coefficient of the refractive optical system section is canceled out by the lateral chromatic aberration coefficient of the first diffractive surface A.

It is understandable from the foregoing that, in the case where the diffractive optical element is put behind the optical system capable of making relatively small the diameter of the diffractive optical element, the use of only one diffractive surface cannot reduce the longitudinal and lateral chromatic aberrations of the entire system at once.

Next, considering another case where two diffractive surfaces are used, likewise, the optical system is divided into a refractive optical system section M, a first diffractive surface A and a second diffractive surface B. Then, the longitudinal chromatic aberration coefficient L and the lateral chromatic aberration coefficient T are expressed as follows:

$$L = h_M^2 \phi_M / \nu_M + h_A^2 \phi_A / \nu_A + h_B^2 \phi_B / \nu_B \tag{3}$$

$$T = h_M H_M \phi_M / \nu_M + h_A H_A \phi_A / \nu_A + h_B H_B \phi_B / \nu_B \tag{4}$$

where $\phi_B$: the refractive power for the design-order diffracted ray of the second diffractive surface B, $\nu_B$: the reduced Abbe number (equivalent to −3.45) of the second diffractive surface B, $h_B$: the height of the paraxial on-axial ray incident on the second diffractive surface B, and $H_B$: the height of the pupil paraxial ray incident on the second diffractive surface B.

At first, with attention to the height $H_A$ in the second term of the equation (4), when the first diffractive surface A is put in a position where the height $H_A$ is relatively low as shown in FIG. 9, the influence of the second term can be regarded as almost zero. If, in this instance, the second refractive surface B is put to a position where the height $h_B$ is not too small, but the height $H_B$ is relatively large, in the third term under a condition that the refractive power of the second diffractive surface B is made to be "$\phi_B<0$", it is possible for the second diffractive surface B to cancel out almost all the lateral chromatic aberration (negative value) of the refractive optical system section M.

In the equation (4), as can be seen from FIG. 9, "$h_A>h_B$" becomes "$h_A^2>>h_B^2$". The influence of the third term for the second diffractive surface B, that is, the tendency to increase the longitudinal chromatic aberration of the entire system can be reckoned to be relatively little. With this in mind, if the first diffractive surface A is given a refractive power of "$\phi_A>0$", the first diffractive surface A becomes able to cancel almost all the longitudinal chromatic aberration (positive value) of the refractive optical system section.

In actual practice, the refractive optical system section is constructed with a plurality of lens surfaces (i=1, . . . , n). The first terms of the equations (3) and (4) each are, therefore, the sum of the values of the coefficient of all the surfaces. However, since the whole of the refractive optical system section has essentially a positive refractive power, the values of the first terms of the equations (3) and (4), in many cases, take the same signs as those for the model of the single lens.

That is, for the refractive optical system section, in most cases, the sign relationships are established as shown by the following equations:

$$\sum_{i=1}^{n} h_i \phi_i / \nu_i > 0 \qquad (6)$$

$$\sum_{i=1}^{n} h_i H_i \phi_i / \nu_i < 0 \qquad (7)$$

These sign relationships are more certain particularly when the extraordinary partial-dispersion glass or the like is not used and the lens structure is made simpler.

Therefore, in a case where the diffractive optical element whose diameter is made relatively small is disposed behind the optical system, if there are provided two diffraction grating surfaces of positive and negative refractive powers respectively and the values of these refractive powers are appropriately determined and these surfaces are arranged in appropriate positions, it is possible to simultaneously reduce the longitudinal and lateral chromatic aberrations of the entire system. For this purpose, it is preferred to satisfy the following conditions:

$$|h_B/h_A|<1 \qquad (8)$$

$$|H_A/H_B|<1 \qquad (9)$$

$$-1<H_B/H_1<0 \qquad (10)$$

where, as the refractive optical system section includes at least one positive lens and at least one negative lens, $H_1$ is a height of a pupil paraxial ray incident on a lens surface closest to the object side of the first lens unit L1, which is disposed closest to the object side, and corresponds nearly to the height $H_M$ of the single lens model described before.

The inequality of condition (8) has an aim to suppress the longitudinal chromatic aberration coefficient to a minimum. When the upper limit is exceeded, the second diffractive surface B strengthens its action. So, the longitudinal chromatic aberration deteriorates. Moreover, the refractive power of the first diffractive surface A, too, has to strengthen. As a result, the pitch of the diffraction grating becomes even finer, so that the diffraction grating becomes very difficult to manufacture.

The inequalities of condition (9) and (10) have an aim to suppress the lateral chromatic aberration coefficient to a minimum. When the upper limit of the equation (9) is exceeded, the first diffractive surface A strengthens its action. So, the lateral chromatic aberration deteriorates. Moreover, the refractive power of the second diffractive surface B, too, has to strengthen. As a result, the pitch of the diffraction grating becomes even finer, so that the diffraction grating becomes very difficult to manufacture. Further, when the upper limit of the condition (10) is exceeded, the second diffractive surface B gets a weaker effect of correcting the lateral chromatic aberration, causing under-correction. When the lower limit of the condition (10) is exceeded, the second diffractive surface B gets a stronger effect of correcting the lateral chromatic aberration, causing over-correction.

To attain more desired results, it is preferred to alter the numerical ranges of the conditions (8), (9) and (10) as follows:

$$|h_B/h_A|<0.95 \qquad (8')$$

$$|H_A/H_B|<0.95 \qquad (9')$$

$$-0.95<H_B/H_1<-0.01 \qquad (10')$$

The discussion of the foregoing type of achromatism by the chromatic aberration coefficients is concerned with two colors and is not always valid in the entire visible spectrum. To correct chromatic aberrations well over the entire visible spectrum, the required properties are described below.

Figure 10:
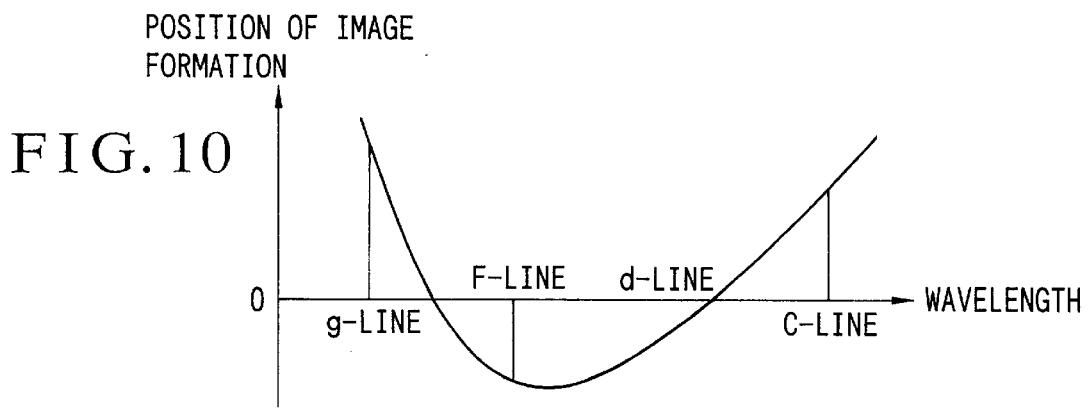
FIG. 10 is a graph for explaining the correction of chromatic aberrations.

At first, in a case where the refractive optical system section is corrected for the longitudinal chromatic aberration in itself without using the extraordinary partial-dispersion glass, the spectrum curve is usually of the shape shown in FIG. 10, having a convex curvature downward and crossing the abscissa at a design wavelength and another one wavelength. That is, it becomes the so-called "achromatic type" spectrum curve.

Next, what spectrum curve the diffractive surface can give will be considered. The phase shape $\psi$(h, m) of the diffractive surface can be expressed by the following polynomial:

$$\psi(h, m)=\{2\Pi/(m,\nu_0)\}(C_1h^2+C_2h^4+C_3h^6+\ldots) \qquad (11)$$

where h: the height in the direction perpendicular to the optical axis, m: the diffraction order of the diffracted ray, $\lambda_0$: the design wavelength, and $C_i$: the phase coefficient (i=1, 2, 3, . . . ).

With this diffractive surface, for an arbitrary wavelength λ and an arbitrary diffraction order m, the refractive power φ(λ,m) can be expressed by using the phase coefficient $C_1$ as follows:

$$\phi(\lambda,m) = -2C_1 m\lambda/\lambda_0 \quad (12)$$

If, in this equation (12), the diffraction order m is taken at, for example, "1", and the phase coefficient is chosen as a negative value, the refractive power of the diffractive surface can be made positive. In this case, as is apparent from the equation (12), for a wavelength region of "$\lambda > \lambda_0$", the longer the wavelength, the stronger the positive refractive power becomes in linear proportion to the variation of the wavelength. Conversely in the other wavelength region of "$\lambda < \lambda_0$", the shorter the wavelength, the weaker the positive refractive power becomes in linear proportion to the variation of the wavelength.

Figure 11:
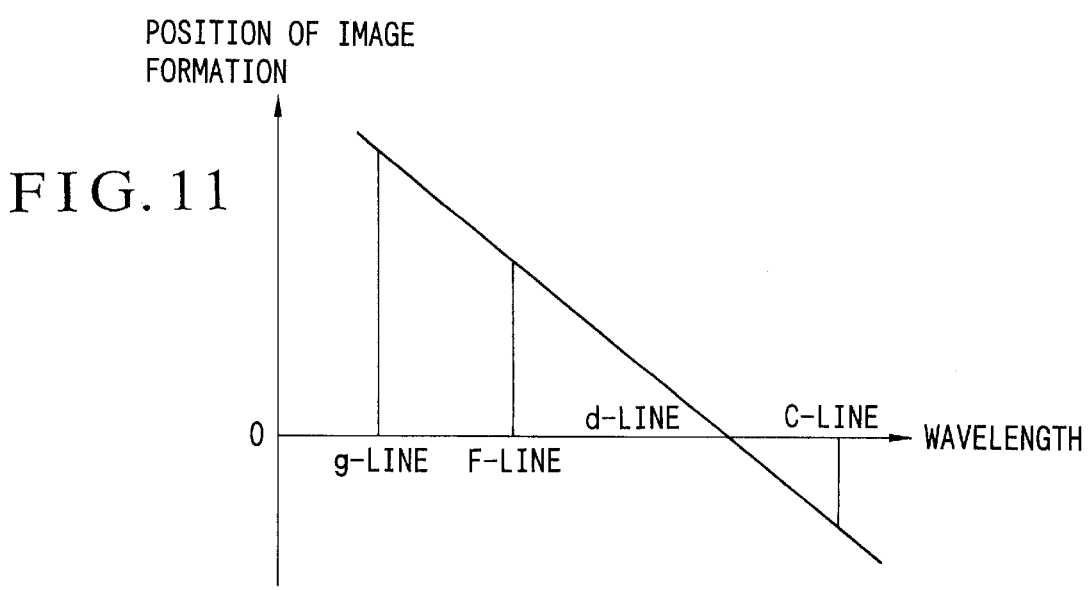
FIG. 11 is a graph for explaining the correction of chromatic aberrations.

In other words, on the assumption that the refractive optical system section disposed on the object side of the diffractive surface is achromatic in respect of the longitudinal chromatic aberration, then, when the focus for the design wavelength $\lambda_0$ is brought into coincidence with the image plane of the entire optical system, the paraxial rays in the region of longer wavelengths than the design wavelength $\lambda_0$ are focused before the image plane of the entire optical system, while the paraxial rays in the region of shorter wavelengths than the design wavelength $\lambda_0$ are focused behind the image plane of the entire optical system. Moreover, as the wavelength changes, the position of the focus shifts linearly as shown in FIG. 11.

Therefore, in order for the diffractive surface to cancel the residual chromatic aberrations of the refractive optical system section, because the diffractive surface alone cannot give such correction as having a convex curvature upward, it is after all required that the refractive optical system section is made up so as to match the linear correction of the diffractive surface. In more detail, the longitudinal chromatic aberration of the linear type with the slope reversed to the linear correction of the diffractive surface must be previously produced by the refractive optical system section.

For this purpose, the refractive optical system section is necessarily constructed in such a way that a first lens of positive refractive power precedes or takes the frontmost position and the first lens unit L1 includes at least one positive lens and at least one negative lens. The use of this construction and arrangement of the constituent lenses leads to change the spectrum curve of the refractive optical system section on both sides of the design wavelength so that, for the longer wavelength region than the design wavelength, even more under-correction results and, for the shorter wavelength region than the design wavelength, even more over-correction results. It is thus made possible to shift the position of the pole of the spectrum curve to shorter wavelengths.

Figure 12:
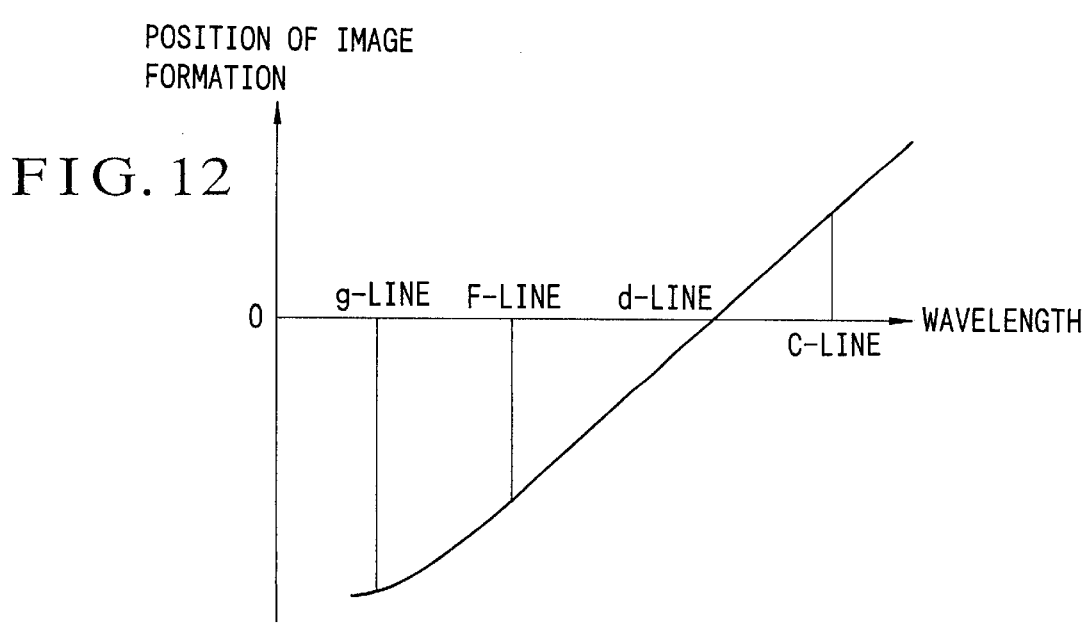
FIG. 12 is a graph for explaining the correction of chromatic aberrations.

As a result, the spectrum curve of the refractive optical system section becomes, as shown in FIG. 12, almost linear over the entire visible spectrum. Therefore, if the refractive power of the diffractive surface is determined to conform with the spectrum curve of the refractive optical system section, achromatism for the entire visible spectrum can be achieved.

To achieve further improvements of the achromatism including the lateral chromatic aberration over the entire visible spectrum, letting the overall refractive power of the entire system be denoted by φ, it is preferred to satisfy the following conditions:

$$0.05 < \phi_A/\phi < 2 \quad (13)$$

$$-2 < \phi_B/\phi < 0.05 \quad (14)$$

When the upper limit of the condition (13) is exceeded, as this means that the refractive power of the first diffractive surface A is too strong, the absolute value of the slope of the longitudinal spectrum line of the first diffractive surface A becomes large. In conformity with it, the spectrum curve of the refractive optical system section, too, has to decline largely, while keeping the linear shape. The spherical aberration and color spherical aberrations, among other aberrations, are caused to deteriorate, which cannot be corrected enough by the terms in higher degrees of the equation (11) with the respective diffraction efficiencies of the diffractive surface A. When the refractive power of the first diffractive surface A is weaker than the lower limit of the condition (13), the absolute value of the slope of the longitudinal spectrum line of the first diffractive surface A becomes so small that the slope of the spectrum curve of the refractive optical system section cannot decrease, while keeping the linear shape. In the shorter wavelength region than the design wavelength, therefore, a tough curvature convex downward is produced, making it impossible to cancel the longitudinal chromatic aberration at the first diffractive surface A. So, these violations are objectionable.

Then, the condition (14) is provided, after the satisfaction of the condition (13), for further improving the lateral chromatic aberration. Either when the upper limit of the condition (14) is exceeded, or when the lower limit is exceeded, the lateral chromatic aberration worsens. Therefore, it is preferred to satisfy the condition (14).

For more improved results, it is preferred to alter the numerical ranges of the conditions (13) and (14) as follows:

$$0.1 < \phi_A/\phi < 1 \quad (13')$$

$$-1 < \phi_B/\phi < -0.1 \quad (14')$$

Further, it is also desired that the first lens unit L1 satisfy the following condition:

$$5 < \nu_P - \nu_N < 75 \quad (15)$$

where $\nu_P$: the mean value of Abbe numbers of positive lenses included in the first lens unit L1 and $\nu_N$: the mean value of Abbe numbers of negative lenses included in the first lens unit L1.

The inequalities of condition (15) have an effect that, while keeping good the various aberrations other than the chromatic aberrations of the refractive optical system section, an appropriate slope is given to the spectrum curve of, in particular, the longitudinal chromatic aberration to loosen the curvature so that the curve is maintained nearly linear in shape. When the upper limit of the condition (15) is exceeded, as this means that the difference between the means values of the Abbe numbers of the positive and negative lenses is too large, the curvature in the shorter wavelength region than the design wavelength becomes tough. Therefore, the chromatic aberrations can no longer be corrected enough at the diffraction surface. Conversely, when the difference between the means values of the Abbe numbers of the positive and negative lenses is too small as exceeding the lower limit of the condition (15), the spectrum curve improves in linearity, but the distribution of the refractive power over all the surfaces of the lenses constituting refractive optical system section collapses and all the aberrations other than the chromatic aberrations can no longer be corrected in good balance. So, these violations are objectionable.

More preferably, the condition (15) is altered as follows:

$$15 < v_P - v_N < 45 \quad (15')$$

Thus, all the aberrations beginning with the chromatic aberrations can be further improved.

Incidentally, in each of the numerical examples, the phase shape $\psi(h, m)$ of the diffractive surface is expressed by the following equation:

$$\psi(h, m) = \{2\Pi/(m\psi_0)\}(C_1 h^2 + C_2 h^4 + C_3 h^6 + \ldots)$$

where h: the height in the direction perpendicular to the optical axis, m: the diffraction order of the diffracted ray, $\psi_0$: the design wavelength, and $C_i$: the phase coefficient (i=1, 2, 3, . . . ).

In the numerical examples, the diffraction order of the diffracted rays is taken at "1", and the design wavelength $\psi_0$ is taken at the spectral d-line (587.56 nm).

In each of the numerical examples, for the focusing purposes, a second lens unit L2 of negative refractive power is disposed in between the first lens unit L1 and the first diffractive surface A and is made axially movable. The second lens unit L2 is preferably constructed with inclusion of at least one positive lens and at least one negative lens. The use of such features can suppress the variation with focusing of chromatic aberrations to a minimum. Particularly, to suppress the variation of lateral chromatic aberration, it is recommended that, as the second lens unit L2 is disposed on the object side of the first diffractive surface A, the variant component of the lateral chromatic aberration is corrected before the rays of light enter the first diffractive surface A.

Incidentally, in the numerical examples, the diffractive surface of positive refractive power is one in number, and the diffractive surface of negative refractive power is one in number, so that the total number of diffractive surfaces is two. However, a number of additional diffractive surfaces may be used. If so, an even better optical performance can be obtained. It is also to be noted that, although each diffractive surface is formed on a parallel flat plate as the base and applied to one of the surfaces thereof, variations may be made by using a spherical lens, or an aspherical lens as the base, or applying the diffractive surface to both surfaces of the plate or lens. Further, the diffractive surface may be applied to the cemented surface of the cemented lens. The material of the base may be not particularly glass, provided it transmits light. Further, additional lenses for correction of aberrations may be used in between the first and second diffractive surfaces A and B and on the image side of the second diffractive surface B.

Next, the numerical examples 1 to 7 of the invention are shown. In the numerical data for the examples 1 to 7, ri is the radius of curvature of the i-th optical surface, when counted from the object side, di is the i-th axial separation between optical surfaces, when counted from the object side, in the reference state, and ni and vi are respectively the refractive index and Abbe number for the d-line of the material of the i-th optical element, when counted from the object side. Incidentally, "f" stands for the focal length, "Fno" stands for the F-number and "2ω" represents the image angle.

Numerical Example 1 f = 292.50   Fno = 1:2.91   2ω = 8.46°

| | | | |
|---|---|---|---|
| r1 = 159.121 | d1 = 13.50 | n1 = 1.51633 | v1 = 64.2 |
| r2 = −705.064 | d2 = 0.15 | | |
| r3 = 123.991 | d3 = 11.00 | n2 = 1.51533 | v2 = 64.2 |
| r4 = 554.293 | d4 = 8.20 | | |
| r5 = −2342.290 | d5 = 5.00 | n3 = 1.67270 | v3 = 32.1 |
| r6 = 176.196 | d6 = 22.09 | | |
| r7 = 66.589 | d7 = 11.00 | n4 = 1.48749 | v4 = 70.2 |
| r8 = 127.559 | d8 = 8.32 | | |
| r9 = 58.679 | d9 = 5.70 | n5 = 1.65446 | v5 = 33.6 |
| r10 = 42.847 | d10 = Variable | | |
| r11 = 226.342 | d11 = 7.00 | n6 = 1.84666 | v6 = 23.8 |
| r12 = −121.673 | d12 = 3.00 | n7 = 1.85026 | v7 = 32.3 |
| r13 = 88.134 | d13 = Variable | | |
| r14 = −523.886 | d14 = 2.50 | n8 = 1.60342 | v8 = 38.0 |
| r15 = 128.755 | d15 = 5.50 | n9 = 1.88300 | v9 = 40.8 |
| r16 = −392.575 | d16 = 4.00 | | |
| *r17 = 0.000 | d17 = 2.00 | n10 = 1.45867 | v10 = 67.9 |
| r18 = 0.000 | d18 = 1.00 | | |
| r19 = 0.000(Stop) | d19 = 29.16 | | |
| *r20 = 0.000 | d20 = 2.00 | n11 = 1.45867 | v11 = 67.9 |
| r21 = 0.000 | d21 = 8.00 | | |
| r22 = 0.000 | d22 = 2.00 | n12 = 1.51633 | v12 = 64.2 |
| r23 = 0.000 | | | |

Phase Coefficients:

r17: $C_1 = -4.19370 \cdot 10^{-4}$   $C_2 = -1.32540 \cdot 10^{-8}$
     $C_3 = -4.81550 \cdot 10^{-11}$   $C_4 = 2.11060 \cdot 10^{-14}$ r20: $C_1 = 5.04550 \cdot 10^{-4}$   $C_2 = 4.34730 \cdot 10^{-8}$
     $C_3 = 4.41550 \cdot 10^{-11}$   $C_4 = -3.83140 \cdot 10^{-14}$

| Variable | Object Distance | |
|---|---|---|
| Separation | ∞ | 3 m |
| d10 | 14.47 | 36.82 |
| d13 | 31.00 | 8.65 |

Numerical Example 2 f = 292.50   Fno = 1:2.91   2ω = 8.46°

| | | | |
|---|---|---|---|
| r1 = 161.178 | d1 = 13.50 | n1 = 1.50378 | v1 = 66.8 |
| r2 = −605.902 | d2 = 0.15 | | |
| r3 = 124.253 | d3 = 11.00 | n2 = 1.48749 | v2 = 70.2 |
| r4 = 626.963 | d4 = 7.78 | | |
| r5 = −1452.331 | d5 = 5.00 | n3 = 1.64831 | v3 = 33.8 |
| r6 = 182.850 | d6 = 22.29 | | |
| r7 = 65.858 | d7 = 11.00 | n4 = 1.48749 | v4 = 70.2 |
| r8 = 124.251 | d8 = 9.43 | | |
| r9 = 58.061 | d9 = 5.70 | n5 = 1.63980 | v5 = 34.5 |
| r10 = 42.330 | d10 = Variable | | |
| r11 = 219.103 | d11 = 7.00 | n6 = 1.84666 | v6 = 23.8 |
| r12 = −122.454 | d12 = 3.00 | n7 = 1.85026 | v7 = 32.3 |
| r13 = 87.573 | d13 = Variable | | |
| r14 = −608.393 | d14 = 2.50 | n8 = 1.61293 | v8 = 37.0 |
| r15 = 123.345 | d15 = 5.50 | n9 = 1.88300 | v9 = 40.8 |
| r16 = −434.291 | d16 = 4.00 | | |
| *r17 = 0.000 | d17 = 2.00 | n10 = 1.51633 | v10 = 64.2 |
| r18 = 0.000 | d18 = 1.00 | | |
| r19 = 0.000(Stop) | d19 = 26.76 | | |
| *r20 = 0.000 | d20 = 2.00 | n11 = 1.51633 | v11 = 64.2 |
| r21 = 0.000 | d21 = 8.00 | | |
| r22 = 0.000 | d22 = 2.00 | n12 = 1.51633 | v12 = 64.2 |
| r23 = 0.000 | | | |

Phase Coefficients:

r17: $C_1 = -4.28740 \cdot 10^{-4}$   $C_2 = -1.74370 \cdot 10^{-8}$
     $C_3 = -5.25780 \cdot 10^{-11}$   $C_4 = 2.49770 \cdot 10^{-14}$ -continued

| | f = 292.50 | Fno = 1:2.91 | 2ω = 8.46° | |
|---|---|---|---|---|
| r20: | $C_1 = 5.08070 \cdot 10^{-4}$ | | $C_2 = 4.77400 \cdot 10^{-8}$ | |
| | $C_3 = 4.98940 \cdot 10^{-11}$ | | $C_4 = -5.07930 \cdot 10^{-14}$ | |

| Variable | | Object Distance | |
|---|---|---|---|
| Separation | ∞ | | 3 m |
| d10 | 14.52 | | 37.23 |
| d13 | 30.06 | | 7.35 |

Numerical Example 3

| | f = 292.50 | Fno = 1:2.91 | 2ω = 8.46° | |
|---|---|---|---|---|
| r1 = 119.301 | d1 = 17.50 | n1 = 1.51633 | ν1 = 64.2 | |
| r2 = −749.188 | d2 = 6.50 | | | |
| r3 = 100.105 | d3 = 17.50 | n2 = 1.51633 | ν2 = 64.2 | |
| r4 = −800.725 | d4 = 1.83 | | | |
| r5 = −511.463 | d5 = 5.00 | n3 = 1.85026 | ν3 = 32.3 | |
| r6 = 233.093 | d6 = 19.32 | | | |
| r7 = 53.139 | d7 = 5.00 | n4 = 1.75550 | ν4 = 25.1 | |
| r8 = 45.149 | d8 = Variable | | | |
| r9 = −250.152 | d9 = 6.20 | n5 = 1.84666 | ν5 = 23.8 | |
| r10 = −81.048 | d10 = 3.20 | n6 = 1.64450 | ν5 = 40.8 | |
| r11 = 85.355 | d11 = Variable | | | |
| r12 = 253.089 | d12 = 2.50 | n7 = 1.74950 | ν7 = 35.3 | |
| r13 = 95.351 | d13 = 6.00 | n8 = 1.80300 | ν8 = 46.7 | |
| r14 = −441.117 | d14 = 3.00 | | | |
| r15 = 0.000(Stop) | d15 = 5.00 | | | |
| *r16 = 0.000 | d16 = 2.00 | n9 = 1.45867 | ν9 = 67.9 | |
| r17 = 0.000 | d17 = 14.55 | | | |
| r18 = 0.000 | d18 = 2.00 | n10 = 1.51633 | ν10 = 64.2 | |
| r19 = 0.000 | d19 = 14.55 | | | |
| *r20 = 0.000 | d20 = 2.00 | n11 = 1.45867 | ν11 = 67.9 | |
| r21 = 0.000 | | | | |

| Phase Coefficients: | | | |
|---|---|---|---|
| r16: | $C_1 = -5.18200 \cdot 10^{-4}$ | | $C_2 = -1.78310 \cdot 10^{-8}$ |
| | $C_3 = -3.44570 \cdot 10^{-11}$ | | $C_4 = 3.12690 \cdot 10^{-14}$ |
| r20: | $C_1 = 6.69110 \cdot 10^{-4}$ | | $C_2 = 4.09040 \cdot 10^{-8}$ |
| | $C_3 = 7.42020 \cdot 10^{-11}$ | | $C_4 = -7.60310 \cdot 10^{-14}$ |

| Variable | | Object Distance | |
|---|---|---|---|
| Separation | ∞ | | 3 m |
| d8 | 23.76 | | 39.95 |
| d11 | 39.31 | | 23.12 |

Numerical Example 4

| | f = 292.50 | Fno = 1:2.91 | 2ω = 3.460 | |
|---|---|---|---|---|
| r1 = 117.352 | d1 = 15.30 | n1 = 1.51821 | ν1 = 65.0 | |
| r2 = −797.987 | d2 = 11.94 | | | |
| r3 = 96.159 | d3 = 13.30 | n2 = 1.49732 | ν2 = 66.3 | |
| r4 = −1142.879 | d4 = 1.98 | | | |
| r5 = −577.645 | d5 = 5.00 | n3 = 1.85026 | ν3 = 32.3 | |
| r6 = 229.602 | d6 = 19.82 | | | |
| r7 = 52.997 | d7 = 5.00 | n4 = 1.72825 | ν4 = 23.5 | |
| r8 = 44.870 | d8 = Variable. | | | |
| r9 = −250.789 | d9 = 5.70 | n5 = 1.84666 | ν5 = 23.8 | |
| r10 = −32.369 | d10 = 3.20 | n6 = 1.64450 | ν6 = 40.8 | |
| r11 = 84.483 | d11 = Variable | | | |
| r12 = 273.186 | d12 = 2.50 | n7 = 1.72047 | ν7 = 34.7 | |
| r13 = 92.471 | d13 = 6.00 | n8 = 1.80300 | ν8 = 46.7 | |
| r14 = −438.423 | d14 = 3.00 | | | |
| r15 = 0.000(Stop) | d15 = 5.00 | | | |
| *r16 = 0.000 | d16 = 2.00 | n9 = 1.51633 | ν9 = 64.2 | |
| r17 = 0.000 | d17 = 14.18 | | | |
| r18 = 0.000 | d18 = 2.00 | n10 = 1.51633 | ν10 = 64.2 | |
| r19 = 0.000 | d19 = 14.18 | | | |
| *r20 = 0.000 | d20 = 2.00 | n11 = 1.51633 | ν11 = 64.2 | |
| r21 = 0.000 | | | | |

| Phase Coefficients: | | | |
|---|---|---|---|
| r16: | $C_1 = -5.32830 \cdot 10^{-4}$ | | $C_2 = -1.68720 \cdot 10^{-8}$ |
| | $C_3 = -3.23100 \cdot 10^{-11}$ | | $C_4 = 2.29270 \cdot 10^{-4}$ |
| r20: | $C_1 = 6.94590 \cdot 10^{-4}$ | | $C_2 = 4.14320 \cdot 10^{-8}$ |
| | $C_3 = 6.80920 \cdot 10^{-11}$ | | $C_4 = -6.65540 \cdot 10^{-14}$ |

| Variable | | Object Distance | |
|---|---|---|---|
| Separation | ∞ | | 3 m |
| d8 | 23.75 | | 39.93 |
| d11 | 40.10 | | 23.92 |

Numerical Example 5

| | f = 390.00 | Fno = 1:2.91 | 2ω = 6.35° | |
|---|---|---|---|---|
| r1 = 160.714 | d1 = 24.11 | n1 = 1.50378 | ν1 = 66.8 | |
| r2 = −550.049 | d2 = 6.33 | | | |
| r3 = 144.933 | d3 = 13.19 | n2 = 1.50378 | ν2 = 66.8 | |
| r4 = 986.476 | d4 = 5.33 | | | |
| r5 = −735.669 | d5 = 7.00 | n3 = 1.80440 | ν3 = 39.6 | |
| r6 = 204.691 | d6 = 44.02 | | | |
| r7 = 72.198 | d7 = 16.00 | n4 = 1.50373 | ν4 = 66.8 | |
| r8 = 167.885 | d8 = 0.23 | | | |
| r9 = 67.571 | d9 = 6.50 | n5 = 1.67270 | ν5 = 32.1 | |
| r10 = 47.593 | d10 = Variable. | | | |
| r11 = 210.803 | d11 = 7.50 | n6 = 1.84666 | ν6 = 23.8 | |
| r12 = −233.908 | d12 = 3.50 | n7 = 1.85026 | ν7 = 32.3 | |
| r13 = 96.102 | d13 = Variable | | | |
| r14 = −891.803 | d14 = 3.00 | n8 = 1.75550 | ν8 = 25.1 | |
| r15 = 546.978 | d15 = 6.00 | n9 = 1.84666 | ν9 = 23.9 | |
| r16 = −387.306 | d16 = 5.00 | | | |
| r17 = 0.000 | d17 = 2.00 | n10 = 1.51633 | ν10 = 64.2 | |
| r18 = 0.000 | d18 = 9.92 | | | |
| r19 = 0.000(Stop) | d19 = 33.47 | | | |
| r20 = 0.0C0 | d20 = 2.00 | n11 = 1.51633 | ν11 = 64.2 | |
| r21 = 0.000 | d21 = 8.00 | | | |
| r22 = 0.000 | d22 = 2.00 | n12 = 1.51633 | ν12 = 64.2 | |
| r23 = 0.000 | | | | |

| Phase Coefficients: | | | |
|---|---|---|---|
| r17: | $C_1 = -3.89430 \cdot 10^{-4}$ | | $C_2 = -6.70090 \cdot 10^{-10}$ |
| | $C_3 = -2.29200 \cdot 10^{-11}$ | | $C_4 = 1.49080 \cdot 10^{-14}$ |
| r20: | $C_1 = 5.17670 \cdot 10^{-4}$ | | $C_2 = 1.18720 \cdot 10^{-8}$ |
| | $C_3 = 3.55700 \cdot 10^{-11}$ | | $C_4 = -6.62930 \cdot 10^{-14}$ |

| Variable | | Object Distance | |
|---|---|---|---|
| Separation | ∞ | | 4 m |
| d10 | 18.42 | | 45.34 |
| d13 | 37.15 | | 10.23 |

Numerical Example 6

| | f = 585.00 | Fno = 1:4.12 | 2ω = 4.24° | |
|---|---|---|---|---|
| r1 = 190.407 | d1 = 24.00 | n1 = 1.51633 | ν1 = 64.2 | |
| r2 = −516.933 | d2 = 3.28 | | | |
| r3 = 233.393 | d3 = 14.00 | n2 = 1.51633 | ν2 = 64.2 | |
| r4 = 1871.499 | d4 = 9.17 | | | |
| r5 = −556.137 | d5 = 7.00 | n3 = 1.80440 | ν3 = 39.6 | |
| r6 = 268.750 | d6 = 139.04 | | | |

-continued

| | | | |
|---|---|---|---|
| r7 = 92.373 | d7 = 11.00 | n4 = 1.51633 | ν4 = 64.2 |
| r8 = 272.360 | d8 = 0.74 | | |
| r9 = 69.257 | d9 = 5.00 | n5 = 1.63636 | ν5 = 35.4 |
| r10 = 56.305 | d10 = Variable | | |
| r11 = 210.582 | d11 = 7.00 | n6 = 1.84666 | ν6 = 23.8 |
| r12 = −190.113 | d12 = 2.80 | n7 = 1.85026 | ν7 = 32.3 |
| r13 = 101.491 | d13 = Variable | | |
| r14 = 0.000 | d14 = 2.00 | n8 = 1.45867 | ν8 = 67.9 |
| r15 = 0.000 | d15 = 17.00 | | |
| r16 = 0.000(Stop) | d16 = 36.07 | | |
| r17 = 0.000 | d17 = 2.00 | n9 = 1.45867 | ν9 = 67.9 |
| r18 = 0.000 | d18 = 8.00 | | |
| r19 = 0.000(Stop) | d19 = 2.00 | n10 = 1.51633 | ν10 = 64.2 |
| r20 = 0.000 | | | |

Phase Coefficients:

| | | | |
|---|---|---|---|
| r14: | C1 = −3.18970 · 10⁻⁴ | | C2 = −8.23150 · 10⁻⁹ |
| | C3 = −1.81890 · 10⁻¹¹ | | C4 = 1.01680 · 10⁻¹⁴ |
| r17: | C1 = 4.05420 · 10⁻⁴ | | C2 = 112510 · 10⁻⁸ |
| | C3 = 5.64840 · 10⁻¹¹ | | C4 = −8.53850 · 10⁻¹⁴ |

| Variable | Object Distance | |
|---|---|---|
| Separation | ∞ | 6 m |
| d10 | 34.91 | 61.30 |
| d13 | 31.99 | 5.60 |

Numerical Example 7

| f = 585.00 | Fno = 1:4.12 | 2ω = 4.240 | |
|---|---|---|---|
| r1 = 192.658 | d1 = 24.00 | n1 = 1.50378 | ν1 = 66.8 |
| r2 = −464.463 | d2 = 1.82 | | |
| r3 = 237.912 | d3 = 14.00 | n2 = 1.49782 | ν2 = 66.8 |
| r4 = 3621.821 | d4 = 8.78 | | |
| r5 = −506.414 | d5 = 7.00 | n3 = 1.79952 | ν3 = 42.2 |
| r6 = 282.840 | d6 = 144.06 | | |
| r7 = 87.192 | d7 = 11.00 | n4 = 1.50378 | ν4 = 66.8 |
| r8 = 266.479 | d8 = 0.15 | | |
| r9 = 70.645 | d9 = 5.00 | n5 = 1.61293 | ν5 = 37.0 |
| r10 = 55.675 | d10 = Variable | | |
| r11 = 214.492 | d11 = 7.00 | n6 = 1.84666 | ν6 = 23.8 |
| r12 = −182.787 | d12 = 2.80 | n7 = 1.85026 | ν7 = 32.3 |
| r13 = 101.326 | d13 = Variable | | |
| r14 = 0.000 | d14 = 2.00 | n8 = 1.51633 | ν8 = 64.2 |
| r15 = 0.000 | d15 = 8.32 | | |
| r16 = 0.000(Stop) | d16 = 25.72 | | |
| r17 = 0.000 | d17 = 2.00 | n9 = 1.51633 | ν9 = 64.2 |
| r18 = 0.000 | d18 = 8.00 | | |
| r19 = 0.000(Stop) | d19 = 2.00 | n10 = 1.51533 | ν10 = 64.2 |
| r20 = 0.000 | | | |

Phase Coefficients:

| | | | |
|---|---|---|---|
| r14: | C1 = −4.83710 · ⁻⁴ | | C2 = −1.82800 · ⁻⁸ |
| | C3 = −3.15590 · ⁻¹¹ | | C4 = 2.32430 · ⁻¹⁴ |
| r17: | C1 = 5.80640 · ⁻⁴ | | C2 = 2.52960 · ⁻⁸ |
| | C3 = 8.61880 · ⁻¹¹ | | C4 = −1.28480 · ⁻¹³ |

| Variable | Object Distance | |
|---|---|---|
| Separation | ∞ | 6 m |
| d10 | 40.34 | 67.30 |
| d13 | 33.04 | 6.08 |

TABLE 1

| | Numerical Example | | |
|---|---|---|---|
| Condition | 1 | 2 | 3 |
| $H_1$ | −1.392 | −1.385 | −1.534 |
| $h_A$ | 0.390 | 0.389 | 0.375 |
| $h_B$ | 0.273 | 0.282 | 0.255 |
| $H_A$ | −0.021 | −0.021 | 0.044 |
| $H_B$ | 0.262 | 0.240 | 0.320 |

TABLE 1-continued

| | Numerical Example | | |
|---|---|---|---|
| f | 292.503 | 292.500 | 292.500 |
| φ | 0.00342 | 0.00342 | 0.00342 |
| $φ_A$ | 0.000839 | 0.000857 | 0.001036 |
| $φ_B$ | −0.00101 | −0.00102 | −0.00134 |
| $ν_P$ | 66.20 | 69.07 | 64.20 |
| $ν_N$ | 32.85 | 34.15 | 28.70 |
| $|h_B/h_A|$ | 0.7012 | 0.7232 | 0.6310 |
| $|H_A/H_B|$ | 0.0813 | 0.0866 | 0.1365 |
| $H_B/H_1$ | −0.1878 | −0.1736 | −0.2035 |
| $φ_A/φ$ | 0.2455 | 0.2508 | 0.3031 |
| $φ_B/φ$ | −0.2952 | −0.2972 | −0.3914 |
| $ν_P-ν_N$ | 33.35 | 34.92 | 35.50 |

| | Numerical Example | | | |
|---|---|---|---|---|
| Condition | 4 | 5 | 6 | 7 |
| $H_1$ | −1.552 | −1.924 | −1.849 | −1.818 |
| $h_A$ | 0.375 | 0.325 | 0.314 | 0.298 |
| $h_B$ | 0.258 | 0.201 | 0.211 | 0.228 |
| $H_A$ | 0.044 | −0.098 | −0.112 | −0.059 |
| $H_B$ | 0.313 | *0.292 | 0.221 | 0.157 |
| f | 292.500 | 390.000 | 585.000 | 585.007 |
| φ | 0.00342 | 0.00256 | 0.00171 | 0.00171 |
| $φ_A$ | 0.001077 | 0.000779 | 0.000638 | 0.000967 |
| $φ_B$ | −0.00139 | −0.00104 | −0.00081 | −0.00116 |
| $ν_P$ | 65.90 | 66.80 | 54.20 | 66.80 |
| $ν_N$ | 30.40 | 35.85 | 37.50 | 39.60 |
| $|h_B/h_A|$ | 0.6877 | 0.6187 | 0.6738 | 0.7658 |
| $|H_A/H_B|$ | 0.1396 | 0.3359 | 0.5092 | 0.3749 |
| $H_B/H_1$ | −0.2015 | −0.1517 | −0.1194 | −0.0866 |
| $φ_A/φ$ | 0.3149 | 0.3038 | 0.3732 | 0.5659 |
| $φ_B/φ$ | −0.4063 | −0.4038 | −0.4743 | −0.6794 |
| $ν_P-ν_N$ | 35.50 | 30.95 | 26.70 | 27.20 |

FIGS. 13A to 13D through FIGS. 26A to 26D show the aberrations of the numerical examples 1 to 7, respectively, where S.C stands for the sine condition, d, g, C and F stand for the spectral d-line, g-line, C-line and F-line, respectively, ΔM stands for the meridional image surface for the d-line, ΔS stands for the sagittal image surface for the d-line, ΔMg stands for the meridional image surface for the g-line, and ΔSg stands for the sagittal image surface for the g-line.

Figure 27:
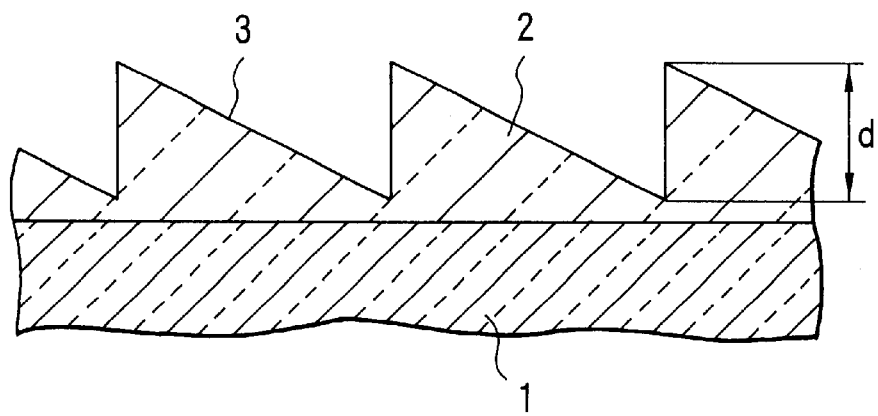
FIG. 27 is a fragmentary sectional view in greatly enlarged scale of a diffractive optical element.
Figure 28:
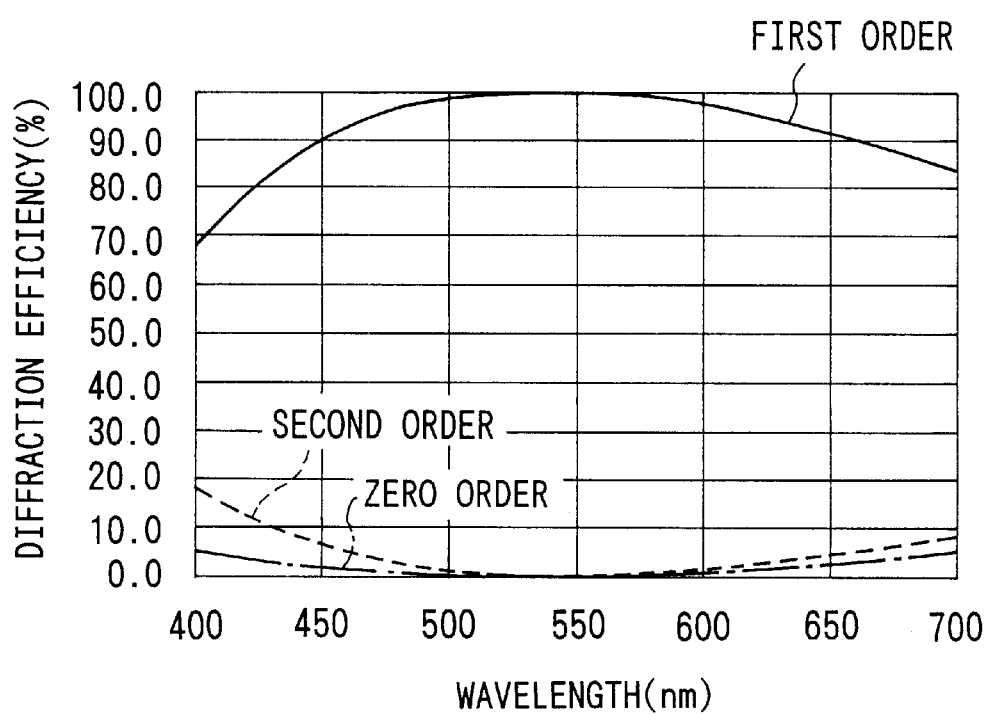
FIG. 28 is a graph of the wavelength-response first-order diffraction efficiency characteristic of the diffractive optical element shown in FIG. 27.

FIG. 27 in sectional view shows an actual example of the diffractive optical element. The surface of a substrate 1 is coated with a layer of ultra-violet ray setting resin, in which a diffraction grating 3 is then formed to such a thickness "d" that the diffraction efficiency of the first-order diffracted rays becomes 100%, at a wavelength of 530 μm. FIG. 28 shows the wavelength-dependent characteristic of the first-order diffraction efficiency of the diffractive optical element shown in FIG. 27. The diffraction efficiency in the design order decreases as the wavelength goes away from an optimized value of 530 μm. Meanwhile, in the neighborhood of the design order, i.e., in the zero and second orders, the diffracted rays increase. Such an increase of the diffracted rays in the orders other than the design order causes production of flare and leads to lower the resolving power of the optical system.

Figure 29:
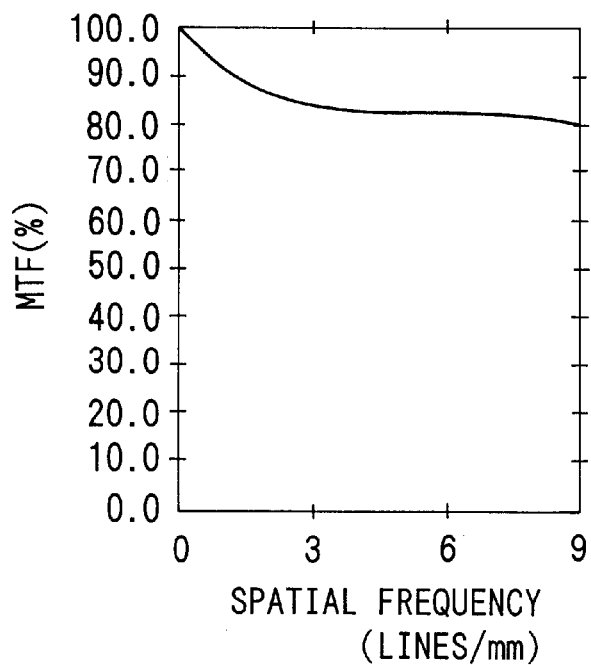
FIG. 29 is a graph of the MTF characteristic of the diffractive optical element shown in FIG. 27.
Figure 30:
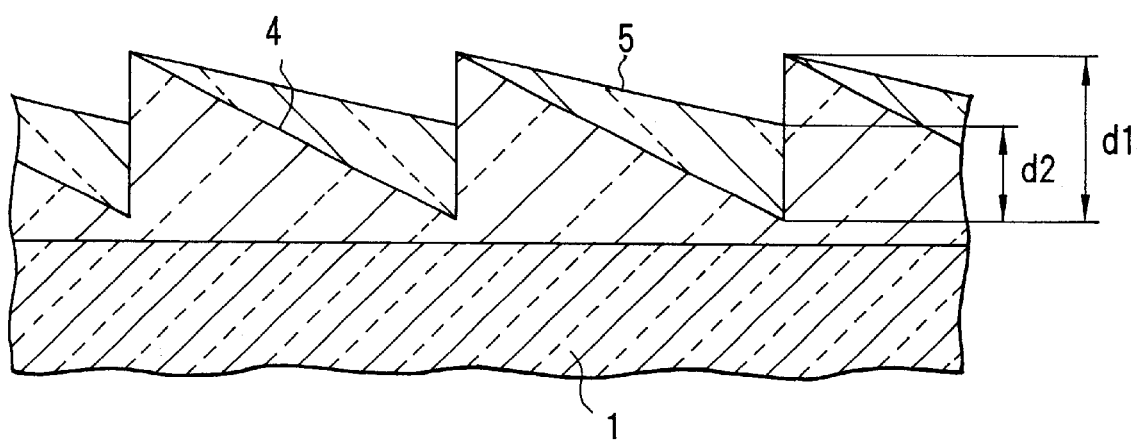
FIG. 30 is a fragmentary sectional view in greatly enlarged scale of a diffractive optical element of multi-layer structure.

FIG. 29 shows the MTF (Modulation Transfer Function) characteristic of the numerical example 1 to the spatial frequency on the axis at the telephoto end, when using the diffractive optical element in the form of the grating shown in FIG. 27. It is understandable that the MTF characteristic slightly drops from the desired value in the low frequency region.

To further improve the diffraction efficiency, it is preferred that the diffractive optical element is constructed in the form of the laminated type described below. So, the diffraction grating of the laminated structure shown in FIG.

30 can be considered to be used as the grating form of the diffractive optical element in the numerical examples. A first diffraction grating 4 made of an ultraviolet setting resin (Nd=1.499, vd=54) is formed on the substrate 1. As stacked on the first diffraction grating 4, a second diffraction grating 5 made of another ultraviolet setting resin (Nd=1.598, vd=28) is formed.

Figure 31:
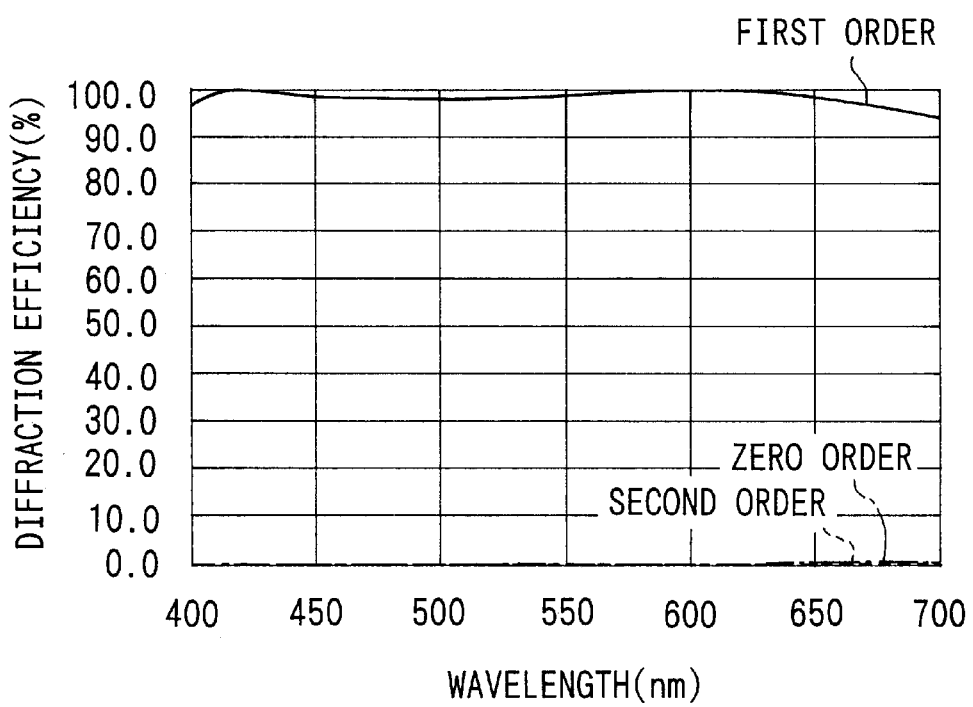
FIG. 31 is a graph of the wavelength-response first-order diffraction efficiency characteristic of the diffractive optical element shown in FIG. 30.

In such combination of materials, the thickness d1 of the first diffraction grating 4 is taken at d1=13.8 μm and the thickness d2 of the second diffraction grating 5 is taken at d2=10.5 μm. FIG. 31 shows the wavelength-dependent characteristic of the first-order diffraction efficiency of the diffractive optical element of the laminated structure. By making the diffraction grating in such a laminated form, the diffraction efficiency for the design order can be increased to higher than 95% over the entire range of useful wavelengths.

Figure 32:
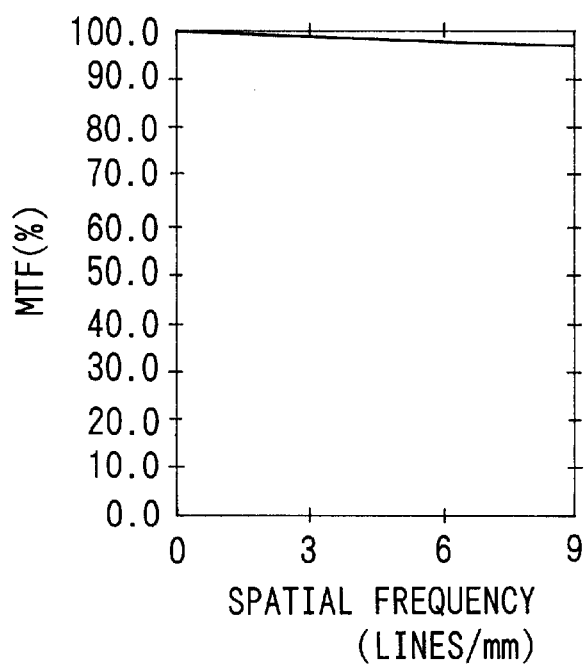
FIG. 32 is a graph of the MTF characteristic of the diffractive optical element shown in FIG. 27.

FIG. 32 shows the spatial-frequency-response MTF characteristics in the case of the diffraction grating of the laminated structure. By using the diffraction grating of the laminated structure, the MTF characteristic is improved in the low frequency region. The desired MTF characteristic is thus obtained. It will be appreciated from the foregoing that, if the diffraction grating of the laminated structure is used as the diffractive optical element in the numerical examples, further improvements of the optical performance can be achieved.

Figure 33:
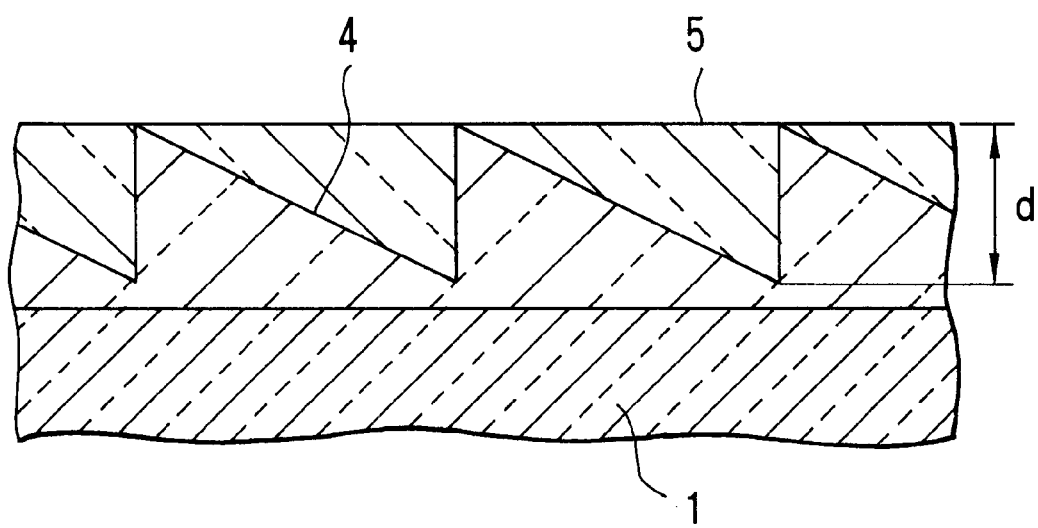
FIG. 33 is a fragmentary sectional view in greatly enlarged scale of another diffractive optical element of multi-layer structure.

Incidentally, for the diffractive optical element described above, the materials are not limited to the ultraviolet setting resin. Other materials such as plastics also may be used instead. For certain substrates, the first diffraction grating 4 may be formed directly in the substrate. Furthermore, there is no need to differentiate the thicknesses of the two gratings from each other. In some combinations of materials, the thicknesses of the two gratings may be made equal to each other as shown in FIG. 33. Since, in this case, no grooves are exposed to the outside from the surface of the diffractive optical element, the dust proof is excellent, contributing to an increase of the productivity on the assembling line in manufacturing the diffractive optical elements.

As described above, according to the diffractive-refractive type photographic optical system, without using extraordinary partial-dispersion glasses or the like, it is possible to provide a large-relative-aperature telephoto lens which is corrected well for chromatic aberrations and other various aberrations, while still remaining low-cost and light-weight.

What is claimed is:

1. A telephoto lens system comprising:
   a first optical system having a plurality of refractive optical elements; and
   a second optical system which receives light from said first optical system, wherein said second optical system has a diffractive optical element having a positive refractive power and a diffractive optical element having a negative refractive power, with said negative diffractive optical element being located between said positive diffractive optical element and an image plane,
   wherein said positive diffractive optical element is disposed closer to a diaphragm than said negative diffractive optical element.

2. A telephoto lens system comprising:
   positive and negative refractive optical elements; and
   positive and negative diffractive optical elements for diffracting light from said positive and negative refractive optical elements,
   wherein said positive diffractive optical element is disposed between (a) said positive and negative refractive optical elements and (b) said negative diffractive optical element,
   wherein said positive diffractive optical element is disposed closer to a diaphragm than said negative diffractive optical element.

3. A telephoto lens system comprising:
   a positive optical unit disposed closest to an object side, said positive optical unit having at least one positive refractive optical element and at least one negative refractive optical element;
   a positive diffractive optical element disposed on an image side of said positive optical unit; and
   a negative diffractive optical element disposed on an image side of said positive diffractive optical element,
   wherein said positive diffractive optical element is disposed closer to a diaphragm than said negative diffractive optical element.

4. An image forming optical system including a plurality of optical units, said image forming optical system comprising:
   a positive optical unit disposed closest to an object side, said positive optical unit having at least one positive refractive optical element and at least one negative refractive optical element;
   a positive diffractive optical element disposed on an image side of said positive optical unit;
   a negative diffractive optical element disposed on an image side of said positive diffractive optical element; and
   a negative optical unit having a negative refractive optical element, between said positive optical unit and said positive diffractive optical element,
   wherein said positive diffractive optical element is disposed closer to a diaphragm than said negative diffractive optical element.

5. An optical system according to claim 4, wherein said negative refractive optical element of said negative optical unit is one or plural in number, and focusing is effected by moving said negative optical unit along an optical axis.

6. An image forming optical system including a plurality of optical units, said image forming optical system comprising:
   a positive optical unit disposed closest to an object side, said positive optical unit having at least one positive refractive optical element and at least one negative refractive optical element;
   a positive diffractive optical element disposed on an image side of said positive optical unit; and
   a negative diffractive optical element disposed on an image side of said positive diffractive optical element;
   wherein the following conditions are satisfied:

$|h_B/h_A|<1$ $|H_A/H_B|<1$ $-1<H_B/H_1<0$ where
   $h_A$ is a height of a paraxial on-axial ray incident on said positive diffractive optical element,
   $h_B$ is a height of a paraxial on-axial ray incident on said negative diffractive optical element,
   $H_A$ is a height of a pupil paraxial ray incident on said positive diffractive optical element,
   $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

7. An optical system according to claim 6, satisfying the following conditions:

$$|h_B/h_A|<0.95$$

$$|H_A/H_B|<0.95$$

$$-0.95<H_B/H_1<-0.01.$$

8. An imaging optical system comprising:
a first optical system having a plurality of refractive optical elements; and
a second optical system which receives light from said first optical system, wherein said second optical system has a diffractive optical element having a positive refractive power and a diffractive optical element having a negative refractive power, with said negative diffractive optical element being located between said positive diffractive optical element and an image plane;
wherein said positive and negative diffractive optical elements are formed respectively on a surface on an object side and a surface on an image side of a single substrate,
wherein said positive diffractive optical element is disposed closer to a diaphragm than said negative diffractive optical element.

9. A system comprising:
positive and negative refractive optical elements; and
positive and negative diffractive optical elements for diffracting light from said positive and negative refractive optical elements,
said optical system satisfying the following conditions:

$$0.05<\phi_A/\phi<2$$

$$-2<\phi_B/\phi<0.05$$

where
$\phi$ is a refractive power of the entire optical system,
$\phi_A$ is a refractive power for a first-order diffracted ray of said positive diffractive optical element, and
$\phi_B$ is a refractive power for a first-order diffracted ray of said negative diffractive optical element.

10. A system comprising:
positive and negative refractive optical elements; and
positive and negative diffractive optical elements for diffracting light from said positive and negative refractive optical elements,
said optical system satisfying the following condition:

$$5<\nu_P-\nu_N<75$$

where, with said positive refractive optical element being one or plural in number, and said negative refractive optical element being one or plural in number,
wherein $\nu_P$ is a value of an Abbe number of said one positive refractive optical element or a mean value of Abbe numbers of said plural positive refractive optical elements, and
$\nu_N$ is a value of an Abbe number of said one negative refractive optical element or a mean value of Abbe numbers of said plural negative refractive optical elements.

11. A system according to claim 10, satisfying the following conditions:

$$15<\nu_P\nu_n<45.$$

12. A system according to one of claims 1 to 4, wherein a diffractive grating of each of said positive and negative diffractive optical elements has a form of rotational symmetry with respect to an optical axis.

13. An imaging optical system, comprising:
a first optical system having a plurality of refractive optical elements; and
a second optical system which receives light from said first optical system, wherein said second optical system has a diffractive optical element having a positive refractive power and a diffractive optical element having a negative refractive power, and said positive diffractive optical element and said negative diffractive optical element correct longitudinal and lateral chromatic aberrations caused by refractive optical elements,
wherein said positive diffractive optical element is disposed closer to a diaphragm than said negative diffractive optical element.

14. An imaging optical system, comprising from object side to image side:
a first lens unit having a positive refractive power;
a second lens unit having a negative refractive power and designed to move for focusing;
a diffractive optical element having a positive refractive power; and
a diffractive optical element having a negative refractive power,
wherein each of said diffractive optical elements corrects longitudinal and lateral chromatic aberrations caused by said first and second lens units.

15. An imaging optical system, comprising from object side to image side:
a first lens unit having a positive refractive power;
a second lens unit having a negative refractive power and designed to move for focusing;
a diffractive optical element having a positive refractive power;
an aperture diaphragm; and
a diffractive optical element having a negative refractive power,
wherein each of said diffractive optical elements corrects longitudinal and lateral chromatic aberrations caused by said first and second lens units.

16. An imaging optical system, comprising from object side to image side:
a first lens unit having a positive refractive power;
a second lens unit having a negative refractive power and designed to move for focusing;
a diffractive optical element having a positive refractive power;
an aperture diaphragm;
a diffractive optical element having a negative refractive power; and
an optical filter,
wherein each of said diffractive optical elements corrects longitudinal and lateral chromatic aberrations caused by said first and second lens units.

17. An optical system comprising:
positive and negative refractive optical elements; and positive and negative diffractive optical elements for diffracting light from said positive and negative refractive optical elements, wherein said positive diffractive optical element is disposed between (a) said positive and negative refractive optical elements and (b) said negative diffractive optical element, wherein said positive and negative diffractive optical elements are formed respectively on a surface on an object side and a surface on an image side of a single substrate, wherein said positive diffractive optical element is disposed closer to a diaphragm than said negative diffractive optical element.

18. An image forming optical system including a plurality of optical units, said image forming optical system comprising:

a positive optical unit disposed closest to an object side, said positive optical unit having at least one positive refractive optical element and at least one negative refractive optical element;

a positive diffractive optical element disposed on an image side of said positive optical unit; and a negative diffractive optical element disposed on an image side of said positive diffractive optical element, wherein said positive and negative diffractive optical elements are formed respectively on a surface on an object side and a surface on an image side of a single substrate, wherein said positive diffractive optical element is disposed closer to a diaphragm than said negative diffractive optical element.

19. A telephoto lens system comprising:

a first optical system having a plurality of refractive optical elements; and a second optical system which receives light from said first optical system, wherein said second optical system has a diffractive optical element having a positive refractive power and a diffractive optical element having a negative refractive power, with said negative diffractive optical element being located between said positive diffractive optical element and an image surface, wherein the following conditions are satisfied:

$|h_B/h_A|<1$ $|H_A/H_B|<1$ $-1<H_B/H_1<0$ where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

20. A telephoto lens system comprising:

positive and negative refractive optical elements; and positive and negative diffractive optical elements for diffracting light from said positive and negative refractive optical elements, wherein said positive diffractive optical element is disposed between (a) said positive and negative refractive optical elements and (b) said negative diffractive optical element, wherein the following conditions are satisfied:

$|h_B/h_A|<1$ $|H_A/H_B|<1$ $-1<H_B/H_1<0$ where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

21. A telephoto lens system comprising:

a positive optical unit disposed closest to an object side, said positive optical unit having at least one positive refractive optical element and at least one negative refractive optical element;

a positive diffractive optical element disposed on an image side of said positive optical unit; and a negative diffractive optical element disposed on an image side of said positive diffractive optical element, wherein the following conditions are satisfied:

$|h_B/h_A|<1$ $|H_A/H_B|<1$ $-1<H_B/H_1<0$ where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

22. An image forming optical system including a plurality of optical units, said image forming optical system comprising:

a positive optical unit disposed closest to an object side, said positive optical unit having at least one positive refractive optical element and at least one negative refractive optical element;

a positive diffractive optical element disposed on an image side of said positive optical unit;

a negative diffractive optical element disposed on an image side of said positive diffractive optical element; and a negative optical unit having a negative refractive optical element, between said positive optical unit and said positive diffractive optical element, wherein the following conditions are satisfied:

$$|h_B/h_A|<1$$

$$|H_A/H_B|<1$$

$$-1<H_B/H_1<0$$

where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

23. An imaging optical system comprising:

a first optical system having a plurality of refractive optical elements; and a second optical system which receives light from said first optical system, wherein said second optical system has a diffractive optical element having a positive refractive power and a diffractive optical element having a negative refractive power, with said negative diffractive optical element being located between said positive diffractive optical element and an image surface;

wherein said positive and negative diffractive optical elements are formed respectively on a surface on an object side and a surface on an image side of a single element, wherein the following conditions are satisfied:

$$|h_B/h_A|<1$$

$$|H_A/H_B|<1$$

$$-1<H_B/H_1<0$$

where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

24. An imaging optical system, comprising:

a first optical system having a plurality of refractive optical elements; and a second optical system which receives light from said first optical system, wherein said second optical system has a diffractive optical element having a positive refractive power and a diffractive optical element having a negative refractive power, and said positive diffractive optical element and said negative diffractive optical element correct longitudinal and lateral chromatic aberrations caused by refractive optical elements, wherein the following conditions are satisfied:

$$|h_B/h_A|<1$$

$$|H_A/H_B|<1$$

$$-1<H_B/H_1<0$$

where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

25. An optical system comprising:

positive and negative refractive optical elements; and positive and negative diffractive optical elements for diffracting light from said positive and negative refractive optical elements, wherein said positive diffractive optical element is disposed between (a) said positive and negative refractive optical elements and (b) said negative diffractive optical element, wherein said positive and negative diffractive optical elements are formed respectively on a surface on an object side and a surface on an image side of a single element, wherein the following conditions are satisfied:

$$|h_B/h_A|<1$$

$$|H_A/H_B|<1$$

$$-1<H_B/H_1<0$$

where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

26. An image forming optical system including a plurality of optical units, said image forming optical system comprising:

a positive optical unit disposed closest to an object side, said positive optical unit having at least one positive refractive optical element and at least one negative refractive optical element;

a positive diffractive optical element disposed on an image side of said positive optical unit; and a negative diffractive optical element disposed on an image side of said positive diffractive optical element, wherein said positive and negative diffractive optical elements are formed respectively on a surface on an object side and a surface on an image side of a single element, wherein the following conditions are satisfied:

$|h_B/h_A|<1$ $|H_A/H_B|<1$ $-1<H_B/H_1<0$ where $h_A$ is a height of a paraxial on-axial ray incident on said positive diffractive optical element, $h_B$ is a height of a paraxial on-axial ray incident on said negative diffractive optical element, $H_A$ is a height of a pupil paraxial ray incident on said positive diffractive optical element, $H_B$ is a height of a pupil paraxial ray incident on said negative diffractive optical element, and $H_1$ is a height from an optical axis of a pupil paraxial ray incident on a surface on the object side of a lens disposed closest to the object side included in said positive optical unit.

* * * * *

UNITED STATES PATENT AND TRADEMARK OFFICE
CERTIFICATE OF CORRECTION

PATENT NO. : 6,313,958 B1
DATED : November 6, 2001
INVENTOR(S) : Hideki Ogawa

It is certified that error appears in the above-identified patent and that said Letters Patent is hereby corrected as shown below:

<u>Title page,</u>
Item [57], ABSTRACT,
Line 4, "optical" should read -- refractive optical --.

<u>Column 2,</u>
Line 60, "|$h_B/h_A$" should read -- |$h_B/h_A$| --.
Line 62, "|$H_A/H_B$" should read -- |$H_A/H_B$| --.

<u>Column 5,</u>
Line 9, "waveiength-response" should read -- wavelength-response --.

<u>Column 6,</u>
Line 41, "/" should read -- /$\upsilon_A$ --.
Line 68, "$\phi_B\upsilon_B$" should read -- $\phi_B/\upsilon_B$ --.

<u>Column 8,</u>
Line 5, "1-" should read -- -1 --.
Line 60, "m,$\upsilon_0$" should read -- m$\lambda_0$ --.

<u>Column 11,</u>
Line 11, "m$\Psi_0$" should read -- m$\lambda_0$ --.
Lines 18 and 21, "$\Psi_0$" should read -- $\lambda_0$ --.

<u>Column 13,</u>
Line 53, "2ω=3.460" should read -- 2ω=8.46° --.
Line 56, "n2 =1.49732 υ2=66.3" should read -- n2=1.49782 υ2=66.8 --.
Line 59, "υ4=23.5" should read -- υ4=28.5 --.
Line 63, "r10=-32.369" should read -- r10=-82.869 --.

<u>Column 14,</u>
Line 29, "d3=13.19" should read -- d3=18.19 --.
Line 33, "n4=1.50373" should read -- n4=1.50378 --.
Line 43, "r20=0.0C0" should read -- r20=0.000 --.
Line 48, "$C_2$=-6.70090·$10^{-10}$" should read -- $C_2$=-6.70000·$10^{-10}$ --.

UNITED STATES PATENT AND TRADEMARK OFFICE
CERTIFICATE OF CORRECTION

PATENT NO. : 6,313,958 B1
DATED : November 6, 2001
INVENTOR(S) : Hideki Ogawa

It is certified that error appears in the above-identified patent and that said Letters Patent is hereby corrected as shown below:

Column 15,
Line 18, "$C2=112510 \cdot 10^{-8}$" should read -- $C2=1.12510 \cdot 10^{-8}$ --.
Line 29, "$2\omega=4.240$" should read -- $2\omega=4.24°$ --.
Line 47, "r14:  $C1 = -4.83710^{-4}$     $C2 = -1.82800^{-8}$
             $C3 = -3.15590^{-11}$    $C4 = 2.32430^{-14}$
       r17:  $C1 = 5.80640^{-4}$      $C2 = 2.52960^{-8}$
             $C3 = 8.61880^{-11}$     $C4 = -1.28480^{-13}$"
should read
       -- r14: $C1 = -4.83710 \cdot 10^{-4}$   $C2 = -1.82800 \cdot 10^{-8}$
              $C3 = -3.15590 \cdot 10^{-11}$  $C4 = 2.32430 \cdot 10^{-14}$
         r17: $C1 = 5.80640 \cdot 10^{-4}$    $C2 = 2.52960 \cdot 10^{-8}$
              $C3 = 8.61880 \cdot 10^{-11}$   $C4 = -1.28480 \cdot 10^{-13}$ --.

Column 16,
Line 11, "-0.2035" should read -- -0.2085 --.
Line 20, "*0.292" should read -- 0.292 --.

Signed and Sealed this

Twelfth Day of November, 2002

Attest:

Attesting Officer

JAMES E. ROGAN
Director of the United States Patent and Trademark Office